(12) United States Patent
Sako et al.

(10) Patent No.: US 7,302,588 B2
(45) Date of Patent: Nov. 27, 2007

(54) DATA RECORDING METHOD, DATA RECORDING DEVICE, AND RECORDING MEDIUM

(75) Inventors: Yoichiro Sako, Tokyo (JP); Shunsuke Furukawa, Tokyo (JP); Tatsuya Inokuchi, Tokyo (JP)

(73) Assignee: Sony Corporation (JP)

( * ) Notice: Subject to any disclaimer, the term of this patent is extended or adjusted under 35 U.S.C. 154(b) by 1013 days.

(21) Appl. No.: 10/069,538

(22) PCT Filed: Jun. 27, 2001

(86) PCT No.: PCT/JP01/05526

§ 371 (c)(1),
(2), (4) Date: Jun. 13, 2002

(87) PCT Pub. No.: WO02/01560

PCT Pub. Date: Jan. 3, 2002

(65) Prior Publication Data

US 2002/0172361 A1    Nov. 21, 2002

(30) Foreign Application Priority Data

| Jun. 27, 2000 | (JP) | ............................. 2000-193444 |
| Jun. 29, 2000 | (JP) | ............................. P2000-195615 |
| Aug. 14, 2000 | (JP) | ............................. P2000-245565 |
| Jan. 12, 2001 | (JP) | ............................. P2001-004893 |

(51) Int. Cl.
*G06F 11/30* (2006.01)
*G06F 12/14* (2006.01)
*H04L 9/32* (2006.01)

(52) U.S. Cl. ...................... 713/193; 713/189; 380/201
(58) Field of Classification Search ................ 713/193, 713/189
See application file for complete search history.

(56) References Cited

U.S. PATENT DOCUMENTS

| 5,598,435 | A | * | 1/1997 | Williams | ..................... 375/261 |
| 6,131,161 | A | * | 10/2000 | Linnartz | ....................... 713/176 |
| 6,157,609 | A | * | 12/2000 | Shoji et al. | ............... 369/275.3 |
| 6,359,846 | B1 | * | 3/2002 | Shoji et al. | ................. 369/47.5 |
| 6,438,692 | B2 | * | 8/2002 | Kato et al. | ................... 713/176 |

\* cited by examiner

*Primary Examiner*—Gilberto Barrón, Jr.
*Assistant Examiner*—Samson Lemma
(74) *Attorney, Agent, or Firm*—Lerner, David, Littenberg, Krumholz & Mentlik, LLP

(57) ABSTRACT

A method for recording digital data in accordance with the recording format, in which the type of a loaded recording medium is identified and on the basis of the result of the identification a data format is selected for embedding sub data into data to be recorded onto the loaded recording medium so that the data are readable as optical changes. Whether the recording area in which recording is to be performed is a recording area in which the sub data should be embedded or not is discriminated, and if the result of the discrimination indicates that the area in which recording is to be carried out is a recording area in which the sub data should be recorded, the sub data are embedded and recorded into the data to be recorded in a predetermined recording area on the recording medium on the basis of the selected data format.

31 Claims, 18 Drawing Sheets

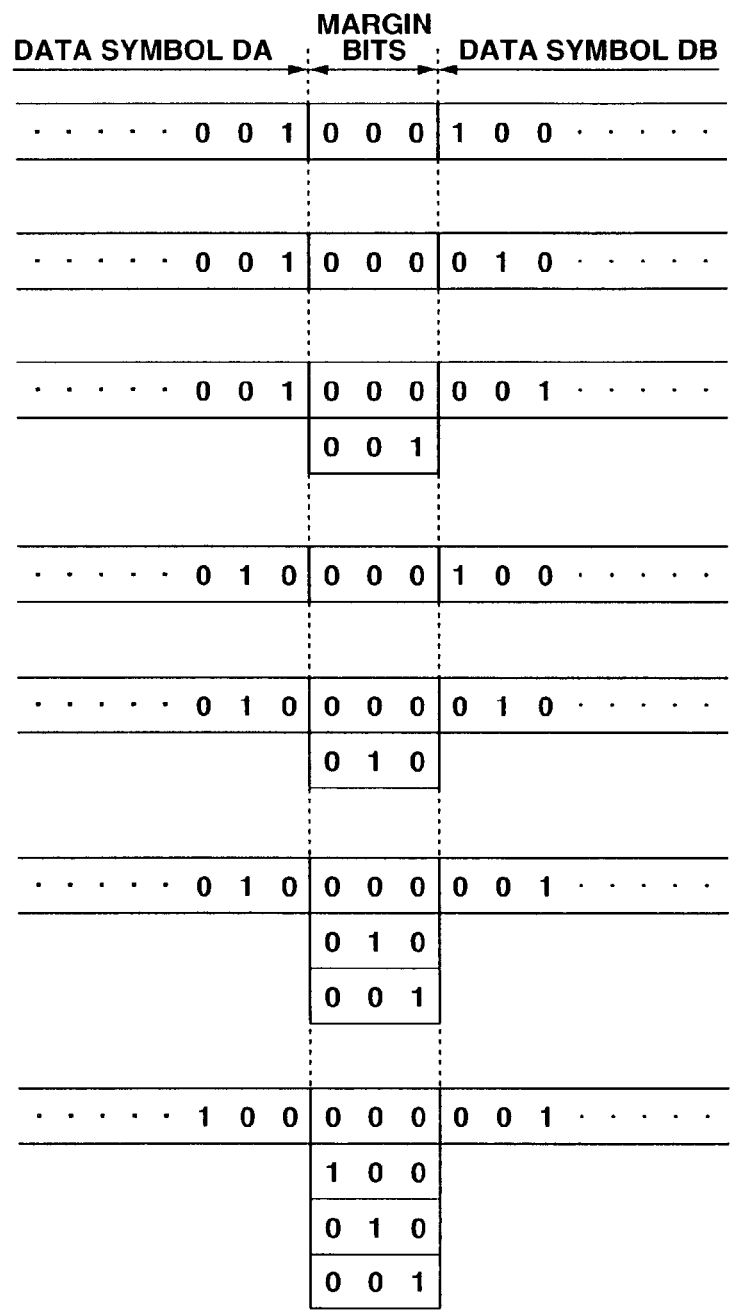

| MEDIUM TYPE (DISC TYPE) | RF LEVEL "L" | RF LEVEL "H" |
|---|---|---|
| ROM-TYPE (REPRODUCTION ONLY) | 0 | 1 |
| RAM-TYPE (CD-R/CD-RW) | 1 | 0 |

FIG.6

| MEDIUM TYPE (DISC TYPE) | DATA PORTION FOR RECORDING SUB DATA |
|---|---|
| ROM-TYPE (REPRODUCTION ONLY) | DATA PORTION SUCH THAT ALL-0 IS FOLLOWED BY ALL-0 IN 8-BIT DATA BEFORE EFM |
| RAM-TYPE (CD-R/CD-RW) | DATA PORTION SUCH THAT ALL-0 IS FOLLOWED BY ALL-1 IN 8-BIT DATA BEFORE EFM |

FIG.7

| MEDIUM TYPE (DISC TYPE) | SUB CODE AREA OF EACH FRAME |
|---|---|
| ROM-TYPE | PATTERN A |
| CD-R-TYPE | PATTERN B |
| CD-RW-TYPE | PATTERN C |

FIG.8

| MEDIUM TYPE (DISC TYPE) | SUB DATA EMBEDDING PATTERN ( — ⇒ "1", ---- ⇒ "0") | | | | |
|---|---|---|---|---|---|
| ROM-TYPE | "H" | — | — | — | ---- |
|  | "L" | ---- | ---- | ---- | — |
| CD-R-TYPE | "H" | — | ---- | ---- | — |
|  | "L" | ---- | — | — | ---- |
| CD-RW-TYPE | "H" | — | ---- | — | ---- |
|  | "L" | ---- | — | ---- | — |

FIG.9

| TYPE OF MAIN DATA (ORIGINAL/COPY) | RF LEVEL "L" | RF LEVEL "H" |
|---|---|---|
| ORIGINAL | 0 | 1 |
| COPY | 1 | 0 |

FIG.16

| TYPE OF MAIN DATA (ORIGINAL/COPY) | DATA PORTION FOR RECORDING SUB DATA |
|---|---|
| ORIGINAL | DATA PORTION SUCH THAT ALL-0 IS FOLLOWED BY ALL-0 IN 8-BIT DATA BEFORE EFM |
| COPY | DATA PORTION SUCH THAT ALL-0 IS FOLLOWED BY ALL-1 IN 8-BIT DATA BEFORE EFM |

FIG.17

| TYPE OF MAIN DATA (ORIGINAL/COPY) | SUB CODE AREA OF EACH FRAME |
|---|---|
| ORIGINAL | PATTERN A |
| COPY | PATTERN B |

FIG.18

| TYPE OF MAIN DATA (ORIGINAL/COPY) | SUB DATA EMBEDDING PATTERN ( —— ⇒ "1" / ---- ⇒ "0" ) | | | |
|---|---|---|---|---|
| ORIGINAL | "H" | —— | ---- | —— |
|  | "L" | ---- | —— | ---- |
| COPY | "H" | ---- | ---- | ---- |
|  | "L" | —— | —— | —— |

FIG.19

| TYPE | SUB DATA EMBEDDING PATTERN ($\longrightarrow$ "1", $----$ "0") | | | | |
|---|---|---|---|---|---|
| ORIGINAL ROM | "H" | — | - - - - | — | — |
| | "L" | - - - - | — | - - - - | - - - - |
| ORIGINAL R/RW | "H" | — | - - - - | — | - - - - |
| | "L" | - - - - | — | - - - - | — |
| COPY ROM | "H" | - - - - | - - - - | - - - - | — |
| | "L" | — | — | — | - - - - |
| COPY R/RW | "H" | - - - - | - - - - | - - - - | - - - - |
| | "L" | — | — | — | — |

FIG.23

DATA RECORDING METHOD, DATA RECORDING DEVICE, AND RECORDING MEDIUM

TECHNICAL FIELD

This invention relates to a data recording method and a data recording device for embedding and recording sub data in main data such as audio data, a data reproducing method and a reproducing device for reproducing the main data and sub data recorded by the data recording method and the data recording device, and a recording medium on which main data and sub data are recorded.

BACKGROUND ART

Conventionally, digital data such as audio data recorded on a recording medium which enables high-speed access such as CD (compact disc) can be copied at a high speed and easily. Moreover, duplicate data resulting from copying of digital data has little deterioration from original information. Therefore, in view of the copyright protection, it has been strongly demanded to take effective measures against unauthorized copying and various techniques have been proposed for preventing unauthorized copying.

For example, a method is proposed in which information for copy prevention is embedded in main data such as audio data in a format which does not affect the main data. According to this method, only a device which can reproduce the information for copy prevention is allowed to reproduce the main data, and therefore this method is effective for preventing unauthorized copying.

However, even if sub data such as information for copy prevention is embedded in main data in a format which does not affect the main data, as described above, it is difficult to prevent unauthorized copying when transmission (or copying) of data equivalent to data recorded on a disc itself, that is, bits of recorded data is carried out at a modulation data level.

DISCLOSURE OF THE INVENTION

In view of the foregoing status of the art, it is an object of the present invention to provide a data recording method and device and a data recording method and device which enable easy detection of unauthorized copying even in the case where transmission (or copying) of bits of recorded data is carried out at a modulation data level.

A recording method for a recording medium according to the present invention comprises: recording main data onto a recording medium on which an identification part indicating the type of the recording medium is provided, so that the main data is readable as optical changes; and embedding sub data at least into a part of the main data on the basis of a format corresponding to the type of the recording medium and recording the sub data along with the main data.

A recording medium according to the present invention has main data recorded thereon so that the main data is readable as optical changes, and also has sub data recorded thereon along with the main data, the sub data being embedded in at least a part of the main data on the basis of a format corresponding to the type of the recording medium, the recording medium having an identification part indicating the type of the recording medium.

Another recording method for a recording medium according to the present invention comprises: recording data onto a recording medium so that the data is readable as optical changes; and embedding and recording sub data into the data recorded in a predetermined recording area of the recording medium on the basis of a format corresponding to the type of the recording medium.

Another recording method for a recording medium according to the present invention comprises: identifying the type of a loaded recording medium; selecting, on the basis of the result of the identification, a data format for embedding sub data into data recorded on the loaded recording medium so that the data is readable as optical changes; discriminating whether a recording area in which recording is to be carried out is a recording area in which the sub data should be embedded; and if, on the basis of the result of the discrimination, the area in which recording is to be carried out is the recording area in which the sub data should be embedded, embedding and recording the sub data into data recorded in a predetermined area of the recording medium on the basis of the selected data format.

A recording device for a recording medium according to the present invention comprises: an encoding processing unit for performing recording modulation processing on inputted data and processing to embed sub data into the data on the basis of a data format selected on the basis of the type of a recording medium to be recorded; and a head unit supplied with output data from the encoding unit and adapted for carrying out recording on the recording medium.

Another recording device for a recording medium according to the present invention comprises: a head unit for recording data onto a recording medium so that the data is optically readable, the recording medium having a first recording area in which data is to be recorded and a second recording area provided at a position to be read out prior to the first recording area; an encoding processing unit for performing recording modulation processing on inputted data and processing to embed sub data into the data on the basis of a data format selected on the basis of the type of the recording medium; and a control unit for controlling the encoding processing unit and the head unit so as to record data to be recorded in the second recording area with the sub data embedded therein.

A reproducing method for a recording medium according to the present invention comprises: detecting an identification part indicating the type of a recording medium provided on a recording medium on which data is recorded so that the data is readable as optical changes and on which data indicating the type and having sub data embedded in at least a part thereof on the basis of a data format corresponding to the type of the recording medium is recorded; discriminating the type of the recording medium on the basis of the data indicating the type read out from the recording medium; detecting whether the result of the detection of the identification part and the result of the discrimination are coincident with each other; and if the results are coincident, extracting and decoding the sub data from the data read out from the recording medium, thus reproducing the data recorded on the recording medium.

Another recording method for a recording medium according to the present invention comprises: recording data onto a recording medium so that the data is readable as optical changes; and embedding and recording sub data into data recorded in a predetermined recording area of the recording medium on the basis of a format corresponding to the type of the data to be recorded on the recording medium.

Another reproducing method for a recording medium according to the present invention comprises: discriminating the type of data recorded on, a recording medium on the basis of data indicating the type of data read out from the recording medium on which the data is recorded so that the data is readable as optical changes and on which data is recorded, the data having sub data embedded in at least a part thereof on the basis of a data format corresponding to the type of the data recorded on the recording medium and indicating the type of the recorded data; and decoding the sub data from the data read out from the recording medium on the basis of the result of the discrimination.

Further objects and specific advantages of the present invention will be clarified by the following description of embodiments.

BRIEF DESCRIPTION OF THE DRAWINGS

FIGS. 4A to 4G are views used for explaining a seam of recorded data recorded by the data recording method according to the present invention.

FIGS. 6 to 9 are views used for explaining an exemplary method for recording sub data by using the data recording method according to the present invention.

FIGS. 16 to 19 are views used for explaining an exemplary method for recording sub data by using a recording method according to a second embodiment of the present invention.

FIG. 23 is a view used for explaining an exemplary method for recording sub data by using the data recording method according to the second embodiment of the present invention.

BEST MODE FOR CARRYING OUT THE INVENTION

Preferred embodiments of the present invention will now be described with reference to the drawings. In the embodiment described hereinafter, audio PCM data is encrypted and recorded onto an optical disc and is reproduced therefrom, and encryption key data used for decrypting the encrypted audio data is embedded as sub data.

In this embodiment, recording of audio PCM data includes recording in an authoring system at a record company or the like, and recording for personal use by a user. In the former case, playback-only (hereinafter referred to as ROM (read only memory) type) disc is used for recording. In the latter case, a recordable/reproducible (hereinafter referred to as RAM (random access memory) type) disc is used for recording. In this embodiment, CD-R (compact disc-recordable) and CD-RW (compact disc-rewritable) discs are used as the RAM-type optical discs of the latter case.

FIRST EMBODIMENT OF DATA RECORDING METHOD AND DATA RECORDING DEVICE

[Data Recording Device]

Figure 1:
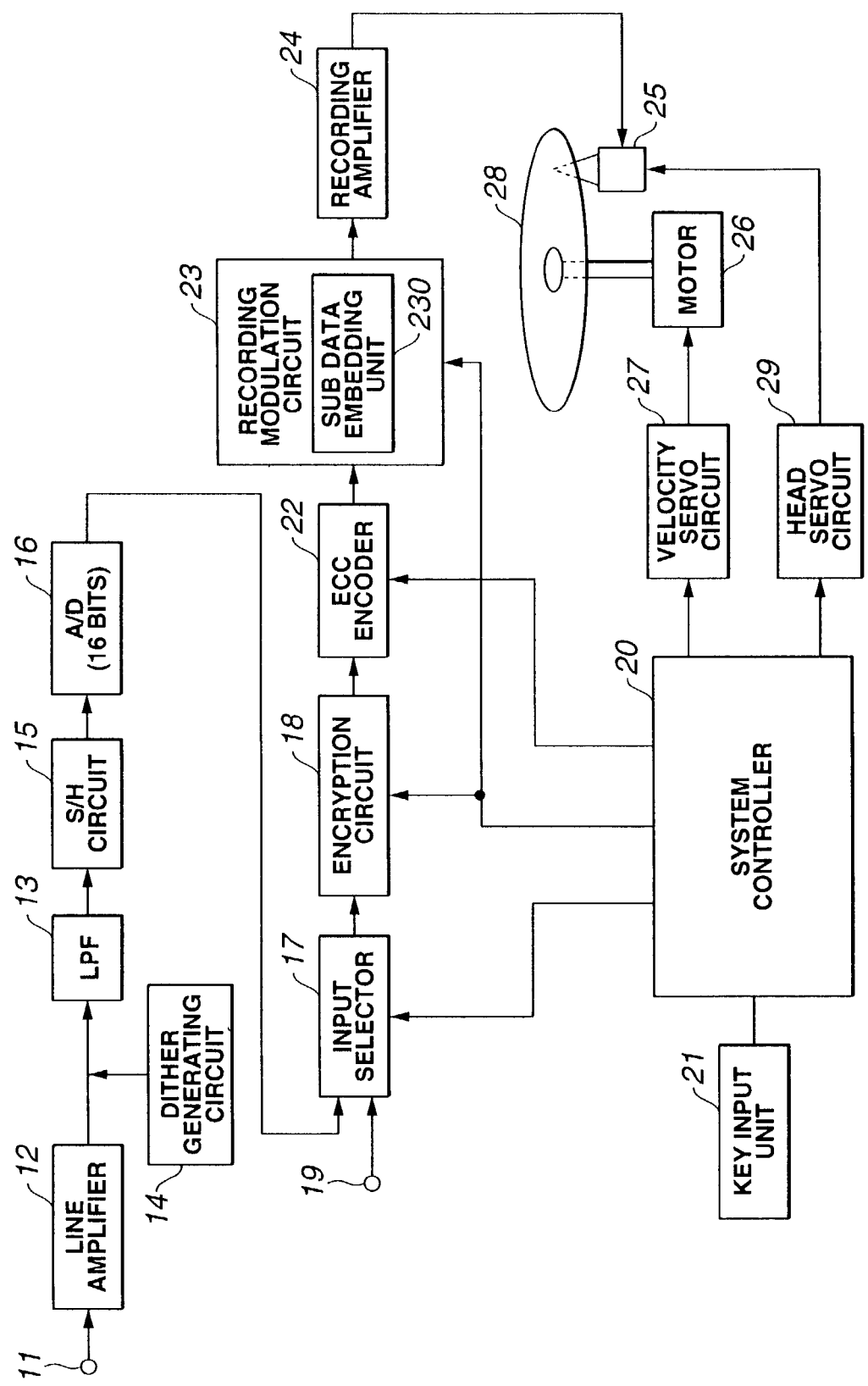
FIG. 1 is a block diagram showing a data recording device according to the present invention.

FIG. 1 is a block diagram showing a data recording device according to a first embodiment of the present invention. The data recording device shown in FIG. 1 handles stereo audio signals of two channels, that is, left and right channels, though FIG. 1 shows only one system for simplification.

In FIG. 1, an analog audio signal inputted through an analog input terminal 11 is supplied to a line amplifier 12, where the signal is converted to an appropriate level and is also impedance-transformed and is then supplied to a low-pass filter 13. A dither signal from a dither generating circuit 14 is added to the output of the line amplifier 12. This dither signal is added to restrain the harmonic of higher order due to quantization noise when the input audio signal is a small signal.

The audio signal which is band-limited by the low-pass filter 13 is supplied to a sample-and-hold circuit 15, where the audio signal is sampled and held by a predetermined sampling frequency, that is, 44.1 kHz in this embodiment. The output of the sample-and-hold circuit 15 is supplied to an A/D converter 16, where it is converted to audio PCM data of 16 bits/sample. Then, this audio PCM data is supplied to an encryption circuit 18 via an input selector 17.

If an input audio signal to be recorded is audio PCM data of 16 bits/sample with a sampling frequency of 44.1 kHz, the audio PCM data is supplied to the input selector 17 via a digital signal input terminal 19.

A system controller 20 supplies to the input selector 17 an input selection signal indicating which audio PCM data is to be outputted from the input selector 17. The system controller 20 generates an input selection signal corresponding to the selection input operation by an operator using a key input unit 21.

The encryption circuit 18 performs encryption processing on the audio PCM data on the basis of an encryption key from the system controller 20 and supplies an output signal resulting from the encryption processing to an ECC encoder 22.

The ECC encoder 22 carries out error correction encoding processing on the input data by using CIRC (cross-interleave Reed-Solomon code). The ECC encoder 22 supplies to a recording modulation circuit 23 the data on which error correction encoding processing has been performed.

The recording modulation circuit 23 carries out recording modulation using the EFM (eight-to-fourteen modulation) system. In the recording device of this embodiment, the recording modulation circuit 23 has a sub data embedding unit 230 in order to embed the encryption key from the system controller 20 as sub data into main data, as will be described later.

The recording modulation circuit 23 supplies the modulated data to a recording head 25 via a recording amplifier 24. The recording head 25 writes the data onto an optical disc 28. The optical disc 28, which is rotationally driven by a spindle motor 26, is servo-controlled by a velocity servo circuit 27 to rotate at a constant linear velocity. The velocity servo circuit 27 generates a velocity servo signal, for example, based on the audio PCM signal to be recorded, and supplies the velocity servo signal to the spindle motor 26.

A recording head servo circuit 29, under the control of the system controller 20, carries out tracking servo control, focusing servo control and thread servo control for the recording head 25.

If the recording device is for an authoring system, for example, a master disc formed by applying a photoresist onto a glass substrate is used in place of the optical disc 28, and a laser beam corresponding to a recording signal is cast onto the photoresist, thus exposing the photoresist. By developing the exposed photoresist, recesses are formed as pits corresponding to the recording signal. A metal master is prepared from the master disc on which the recording signal is thus recorded, and this metal master or a stamper produced from the metal master is used to prepare a ROM-type optical disc on which the pit pattern corresponding to the recording signal is formed.

If the recording device is a recording device for consumer instead of a recording device for authoring system, and the optical disc 28 is a CD-R disc, the recording head 25 melts the recording layer of the optical disc 28. The molten part becomes transparent and the portion constituting the optical disc corresponding to this part is deformed, thus forming a part which has a similar function to pits on the ROM-type optical disc. Thus, recording of data is carried out. In the case of a CD-RW disc, the recording layer is changed between crystalline and amorphous materials by a light beam cast thereon and the reflectance is thus changed for recording data.

The recording attributes in the case of a CD-R disc includes the transparency of the recording layer and the presence of deformation of the substrate. These attributes appear as the difference in light reflectance in reproduction. The recording attribute in the case of a CD-RW disc is the crystallinity or amorphousness, which appears as the difference in light reflectance in reproduction. Also, the recording attributes of the pits and lands on a ROM-type disc appear as the difference in light reflectance in reproduction. Therefore, with respect to the above-described three types of disc media, the recording attributes can be detected as the RF (radio frequency) output level from the optical pickup in reproduction, that is, "H" for high level and "L" for low level. Thus, reproduction of sub data is made possible.

The present invention is not limited to the case of using only the recording attributes that can be detected as the RF output level in reproduction, and can also be applied to other recording media such as a magneto-optical disc.

[First Example of Sub Data Recording Method]

A first example of a sub data recording method (embedding method) will now be described. In this first example, recording modulation based on the EFM system is performed on main data by the recording modulation circuit 23 and encryption key information is embedded as sub data into the main data. This example will be described in detail hereinafter.

The recording modulation circuit 23, which carries out recording modulation based on the EFM system, converts each of one-byte (eight-bit) symbols to 14 bits and inserts three connection bits (hereinafter referred to as margin bits) between the 14-bit data symbols for the following purpose.

That is, in the case of a ROM-type disc such as CD, the main data to be EFM-modulated and recorded is recorded by so-called edge recording in which a change point between a pit and a land in the scanning direction of a light beam is recorded as a data bit of "1", instead of recording the data correspondingly to the two types of recording attributes of pits and lands as described above.

Therefore, the length of a pit or a land in the scanning direction of the light beam is equivalent to the spacing between one data bit "1" and the next data bit "1". This spacing determines the frequency band of the recording signal, and the spacing between one data bit "1" and the next data bit "1" is selected so that the main data is recorded within the frequency band provided for the disc as a recording medium. In the CD format, it is prescribed that the spacing between one data bit "1" and the next data bit "1" not less than 3T (T is the length of one bit) and not more than 11T.

The 14-bit symbol data is selected in consideration of the above. However, even though the above-described condition is met within one data symbol of 14 bits, there is a problem of the seam between data symbols. Thus, three connection bits (margin bits) are inserted to solve the problem of the seam between data symbols. Specifically, four types of three margin bits [000], [100], [010] and [001] are prepared and one of them is inserted to the seam between data symbols, thus securing the above-described spacing of not less than 3T and not more than 11T.

Another role of the margin bits is adjustment of deviation in the DC (direct current) balance. Since the main data is recorded by edge recording as described above, the position of the data bit "1" may correspond to the edge, which is the boundary between a pit and a land. Therefore, any of the recording attributes of pits and lands may be arranged before or after the data bit "1". However, in consideration of the DC balance of the recording signal, it is preferred that the probabilities of appearance of pits and lands are equal.

The 14-bit data symbol, too, is selected in consideration of the DC balance of the recording signal, but it is insufficient and the DC balance is adjusted by margin bits. The DSV (digital sum value) before margin bits is found and the margin bits are selected from the above-described four types so that the DSV becomes zero as much as possible.

The main data is recorded as changes and no changes of the recording attributes, as described above. For example, in the case of a ROM-type disc, the main data is recorded as the edges of pits and no information is recorded on the pits and lands themselves. In this embodiment, sub data is recorded and embedded by causing the sub data to correspond to the recording attributes of the pits and lands themselves.

Specifically, in the case of EFM recording, the margin bits as described above are inserted every data symbol, and therefore by selecting the margin bits to be inserted, it is possible to control whether a predetermined bit position of one data symbol, for example, the leading bit position, is a pit or a land. Accordingly, by causing a pit to correspond to one of "1" and "0" of the sub data, while causing a land to correspond to the other of "1" and "0", and then controlling the margin bits in accordance with the sub data to be recorded, one bit of the sub data can be embedded, for example, as the recording attribute of the leading part of one data symbol of the main data.

Since the margin bits have the function to adjust the DSV for the DC balance as described above, embedding the sub data into all the data symbols of the main data might significantly influence the adjustment of the DC balance.

Thus, in this embodiment, the sub data is partially embedded to such an extent that there is little influence of the margin bits on the DSV adjustment. In this case, it is a matter of course that the sub data must be embedded in such a manner that the sub data can be detected in reproduction.

In a first method for partially embedding the sub data to such an extent that there is little influence of the margin bits on the DSV adjustment, the recording area is limited so as to record the sub data only in a predetermined recording area on the disc.

Figure 2:
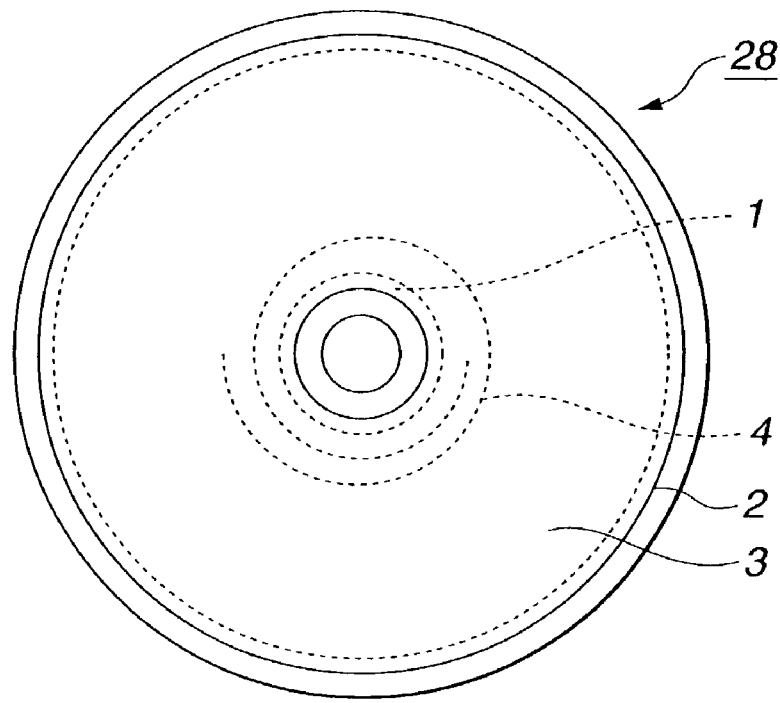
FIG. 2 is plan view showing a recording medium on which data is recorded by the data recording device and recording method according to the present invention.

For example, in FIG. 2, which shows the disc 28, audio PCM data on which error correction encoding and recording modulation have been performed as described above is continuously recorded as a recording track 4 made up of pits in a data recording area (program area) 3 between a lead-in area 1 on the inner circle side of the disc 28 and a lead-out area 2 on the outer circle side.

There is a method in which only the lead-in area 1 or the lead-out area 2 of FIG. 2 is used as the predetermined are on the disc for recording the sub data. Another method may be used in which only a TOC (table of contents) area in the lead-in area 1 is used. The main data recorded in these areas is predetermined data such as additional data, instead of audio PCM data.

Figure 3:
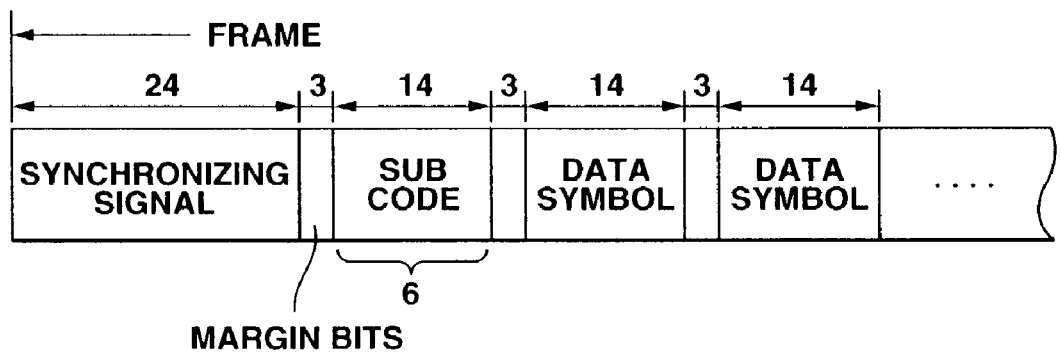
FIG. 3 is a view used for explaining a part of the recording data format of the data recorded on the recording medium according to the present invention.

Moreover, the sub data may be embedded into a sub code area of each frame in the program area 3, as the predetermined recording area. Specifically, in FIG. 3, which shows data near the leading part of data of one frame (588 channel bits), the leading 24 bits of one frame constitute a synchronizing signal and three margin bits area inserted after this synchronizing signal, followed by a sub code area 6 in which a sub code is recorded. Since the sub code area 6 is an area immediately after the synchronizing signal of the frame, it is easily detectable in reproduction.

In a second method for partially embedding the sub data to such an extent that there is little influence of the margin bits on the DSV adjustment, the sub data is embedded into only a predetermined data portion of a specified recording pattern. The recording pattern which enables embedding will now be considered.

For example, between a 14-bit data symbol DA and the subsequent 14-bit data symbol DB, margin bits are assigned as shown in FIGS. 4A to 4G in accordance with the combination of the recording patterns of the data symbols DA, DB.

Of these, in the case of the recording patterns shown in FIGS. 4A, 4B and 4D, only fixed margin bits [000] can be assigned so as to secure the spacing of not less than 3T and not more than 11T as the spacing between a data bit "1" and the next data bit "1". However, in the other recording pattern portions, two or more types of margin bits can be assigned as shown in FIGS. 4A to 4G and whether the leading part of the data symbol DB is a pit or a land can be controlled.

FIGS. 5A to 5D are views for explaining how to embed the sub data. In this case, the recording pattern of FIG. 4E is used. In FIGS. 5A to 5D, it is assumed that a reproduced RF signal has a low level "L" in a pit portion and "H" in a land portion.

Figure 5A:
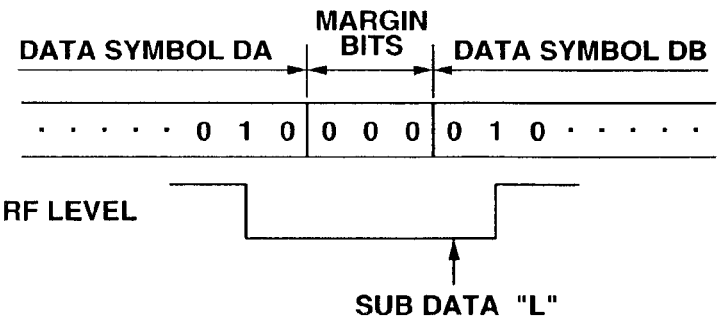
FIGS. 5A to 5D are views used for explaining a recording method for sub data recorded by the data recording method according to the present invention.

In the case of FIG. 5A, the recording attribute corresponding to the last data bit of the data symbol DA before the margin bits is a pit, and the sub data to be recorded is a bit value corresponding to a pit, of "1" and "0", for example "0" (the reproduced RF output is "L"). That is, both the recording attributes before and after the margin bits are pits.

In this case, [000] is selected as the margin bits and the recording attribute is not inverted within the margin bit section. Thus, the recording attribute corresponding to the leading data bit of the data symbol DB after the margin bits can be a pit, and the bit value "0" of the sub data is recorded as the recording attribute of the leading part of the data symbol DB after the margin bits.

Figure 5B:
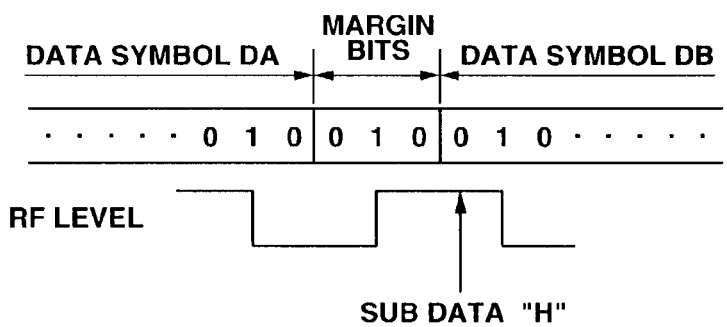

In the case of FIG. 5B, the recording attribute corresponding to the last data bit of the data symbol DA before the margin bits is a pit, and the sub data to be recorded is a bit value corresponding to a land, of "1" and "0", for example "1" (the reproduced RF output is "H"). The recording attribute changes before and after the margin bits, that is, the recording attribute before the margin bits is a pit and the recording attribute after the margin bits is a land.

In this case, for example, [010] is selected such that the recording attribute is inverted within the margin bit section. Thus, the recording attribute corresponding to the leading data bit of the data symbol DB after the margin bits is a land, and the bit value "1" of the sub data is recorded as the recording attribute of the leading part of the data symbol DB after the margin bits.

Figure 5C:
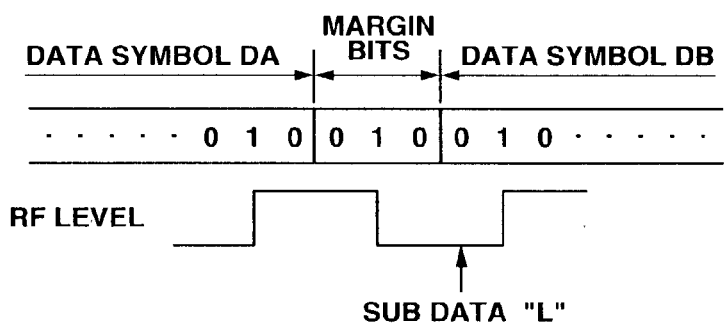

In the case of FIG. 5C, the recording attribute corresponding to the last data bit of the data symbol DA before the margin bits is a land, and the sub data to be recorded is a bit value corresponding to a pit, of "1" and "0", for example "0" (the reproduced RF output is "L"). The recording attribute changes before and after the margin bits, that is, the recording attribute before the margin bits is a land and the recording attribute after the margin bits is a pit.

In this case, for example, [010] is selected such that the recording attribute is inverted within the margin bit section. Thus, the recording attribute corresponding to the leading data bit of the data symbol DB after the margin bits is a pit ("L"), and the bit value "0" of the sub data is recorded as the recording attribute of the leading part of the data symbol DB after the margin bits.

Figure 5D:
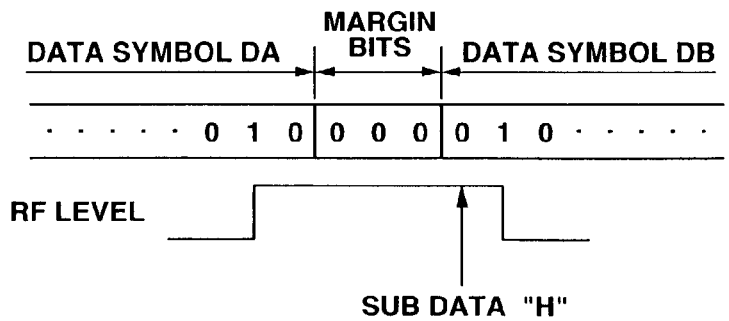

In the case of FIG. 5D, the recording attribute corresponding to the last data bit of the data symbol DA before the margin bits is a land, and the sub data to be recorded is a bit value corresponding to a land, of "1" and "0", for example "1". That is, both the recording attributes before and after the margin bits are lands. attribute is not inverted. Thus, the recording attribute corresponding to the leading data bit of the data symbol DB after the margin bits can be a land ("H"), and the bit value "1" of the sub data is recorded as the recording attribute of the leading part of the data symbol DB after the margin bits.

FIGS. 5A to 5D show the case of the recording pattern of FIG. 4E and therefore the [010] pattern is used as the margin bits for inverting the recording attribute. However, [001] is used in the case of FIG. 4C, and [010] or [001] is used in accordance with the DSV in the case of FIG. 4F. In the case of FIG. 4G, the [100], [010] or [001] pattern is used in accordance with the DSV.

The sub data can be embedded into the main data as described above. In this embodiment, the sub data is recorded in predetermined data portions of the main data having the recording patterns of FIGS. 4C, 4E, 4F and 4G. For example, the sub data is recorded when both the data symbols DA and DB have the all-"0" recording pattern, as expressed by eight-bit data symbols prior to EFM.

In this embodiment, since the sub code is recorded as a fixed pattern, the synchronizing signal of the fixed pattern and the sub code of the fixed pattern may be caused to be the data symbols DA, DB, and the margin bits between them may be controlled by the sub data, thus recording the sub data as the recording attribute of the leading part of the 14-bit data symbol of the sub code.

Of course, it is possible to combine the first method and the second method for partially embedding the sub data to such an extent that there is little influence of the margin bits on the DSV adjustment. Specifically, the sub data is embedded into a specified recording pattern portion in the TOC area. The TOC area includes, for example, an all-"0" pattern and an all-"1" pattern in the form of eight-bit data symbols. Therefore, these recording pattern portions can be used.

A plurality of predetermined data portions for embedding the sub data may be selected and the sub data may be embedded into the plurality of predetermined data portions.

With respect to the specified recording pattern portion in which the sub data is to be embedded, the recorded data may be read and detected in advance before actual recording, and the sub data may be embedded and recorded into the detected specified recording pattern portion.

If the specified recording pattern portion in which the sub data is to be embedded is the sub code portion, its recording position is predetermined, for example, after the synchronizing signal. Therefore, the reading in advance as described above is not necessary. That is, if the specified recording pattern portion in which the sub data is to be embedded has a predetermined recording position, the reading of the recorded data in advance as described above is not necessary.

The sub data can be embedded and recorded into the main data in the above-described manner. However, if the bits of the recorded data are transmitted (or copied) at the modulation data level, the sub data, too, is transmitted as it is. If no effective measures are taken, it is difficult to prevent unauthorized copying. In view of this, in the first embodiment, the recording method for the sub data is changed in accordance with the type of the disc, thus enabling effective prevention of unauthorized copying even when the sub data is transmitted.

In the following example, the recording method for the sub data is changed in accordance with the disc type, for example, a ROM-type disc and a RAM-type disc.

In a first method for changing the recording method for the sub data in accordance with the type of the disc, the correspondence of the binary data "1", "0" of the sub data to the recording attributes of the recording medium is changed between a ROM-type disc and a RAM-type disc. FIG. 6 shows an example of the corresponding relation.

In the example of FIG. 6, in the case of a ROM-type disc, a pit which has a low reflectance and a low RF signal level ("L") in reproduction is caused to correspond to "0" of the sub data, and a land which has a high reflectance and a high RF signal level ("H") in reproduction is caused to correspond to "1" of the sub data. On the other hand, in the case of a RAM-type disc, a recording attribute having a low reflectance and a low RF signal level ("L") in reproduction is caused to correspond to "1" of the sub data, and a recording attribute having a high reflectance and a high RF signal level ("H") in reproduction is caused to correspond to "0" of the sub data.

Thus, even when duplication of the data at the modulation level, for example, from a ROM-type disc, is carried out, the disc type after the duplication is the RAM-type and therefore the bits of the sub data are reproduced as being inverted and the sub data cannot be correctly reproduced.

In a second method for changing the recording method for the sub data in accordance with the type of the disc, a predetermined data portion for embedding the sub data is changed at least between a ROM-type disc and a RAM-type disc.

FIG. 7 shows an example of this second method. In this example, in the case of a ROM-type disc, the margin bits are controlled and the sub data is embedded in a recording pattern portion having all-"0" followed by all-"0" in an eight-bit data symbol prior to EFM processing. On the other hand, in the case of a RAM-type disc, the margin bits are controlled and the sub data is embedded in a recording pattern portion having all-"0" followed by all-"1" in an eight-bit data symbol prior to EFM processing.

FIG. 8 shows another example of this second method. In this example, since a fixed pattern is to be recorded in the sub code area as described above, the fixed pattern is varied in accordance with the type of the disc. The data preceding the sub code area is a synchronizing signal, which is a fixed pattern. Therefore, by controlling the margin bits between the synchronizing signal and the sub code, the sub data can be embedded in accordance with whether, for example, the leading part of the sub code area is a pit or a land.

By causing the data in the sub code area to be different fixed patterns among a ROM-type disc, a CD-R disc and a CD-RW disc as shown in FIG. 8, the data in the sub code area can be used for discriminating the disc type on the reproducing side.

A third method for changing the recording method for the sub data in accordance with the type of the disc is a modification of the first method in which the correspondence of the binary data "1", "0" of the sub data to the recording attributes of the recording medium is changed between a ROM-type disc and a RAM-type disc.

That is, in the above-described first method, the correspondence of the binary data "1", "0" of the sub data to the recording attributes of the recording medium is univocally changed between a ROM-type disc and a RAM-type disc as shown in FIG. 6, whereas in this third method, the correspondence of the binary data of the sub data to the recording attributes of the recording medium is changed every predetermined unit of the sub data, and the change pattern is changed at least between a ROM-type disc and a RAM-type disc.

FIG. 9 shows an example of this third method. In this example, the correspondence of the binary data of the sub data to the recording attributes of the recording medium is made changeable every bit of the sub data and is repeated as a four-bit pattern of the sub data. In the following description, a unit by which the correspondence of the binary data of the sub data to the recording attributes of the recording medium is changed is referred to as a set.

In the example of FIG. 9, four sets form a repetition cycle and the repetition cycle of four sets is changed among a ROM-type disc, a RAM-type CD-R disc and a CDRW disc, as shown in FIG. 9.

In the sub data embedding patterns shown in FIG. 9, a solid line indicates "1" of the sub data and a broken line indicates "0" of the sub data. In the case of a ROM-type disc, with respect to the consecutive three bits of the four-bit repetition pattern of the sub data, a land "H" is allocated to "1" and a pit "L" is allocated to "0", while with respect to the remaining one bit of the four-bit repetition pattern of the sub data, a land "H" is allocated to "0" and a pit "L" is allocated to "1".

In the case of a CD-R disc, in the four-bit repetition pattern of the sub data, the state in which a land "H" is allocated to "1" and a pit "L" is allocated to "0" and the state in which a land "H" is allocated to "0" and a pit "L" is allocated to "1" are alternately arranged every two bits of the sub date.

In the case of a CD-RW disc, in the four-bit repetition pattern of the sub data, the state in which a land "H" is allocated to "1" and a pit "L" is allocated to "0" and the state in which a land "H" is allocated to "0" and a pit "L" is allocated to "1" are alternately arranged every bit of the sub date.

According to this third example, even if duplication of data at the modulation level, for example, from a ROM-type disc, is carried out, the disc type after the duplication is the RAM-type and the sub data embedding pattern is different. Therefore, the sub data cannot be correctly reproduced, enabling effective prevention of unauthorized copying.

In the example of FIG. 9, a set in the embedding pattern, that is, a unit by which the correspondence of the binary data of the sub data to the recording attributes of the recording medium is changed, is arranged every bit of the sub data. However, it may be changeable every plural bits, for example, every byte (eight bits). Alternatively, it may be changeable every sector or every 32 sectors (one packet/one block).

The repetition cycle is not limited to four sets. For example, in changing the embedding pattern between two types of discs of a ROM-type disc and a RAM-type disc, the repetition sets may be two or more sets.

A fourth method is a modification of the above-described third method. In this fourth method, the correspondence of the binary data of the sub data to the recording attributes of the recording medium is not changed every predetermined data unit of the sub data but is changed in accordance with the difference in the recording area on the disc for the sub data, thus changing the sub data embedding pattern in accordance with the disc type.

Specifically, the correspondence of the binary data of the sub data to the recording attributes of the recording medium is made changeable every area for recording the sub data such as the lead-in area, the lead-out area and the TOC area. In accordance with the disc type, the correspondence of the binary data of the sub data to the recording attributes of the recording medium is changed among the plurality of areas.

The area for recording the sub data may also be changed in accordance with the disc type.

Of course, it is possible to combine the first method and the second method for changing the recording method for the sub data in accordance with the type of the disc. Specifically, the corresponding relation between "0", "1" of the sub data and the recording attributes such as pit and land is changed in accordance with the disc type, and the sub data embedding pattern is changed in accordance with the disc type.

It is also possible to optionally combine the first method, the second method, the third method or the fourth method for changing the recording method for the sub data in accordance with the type of the disc. For example, the sub data is recorded in a predetermined data portion including a specified recording pattern which differs in accordance with the type of the recording medium, and the sub data embedding pattern including a change in the corresponding relation between "0", "1" of the sub data and the recording attributes such as pit and land is varied in accordance with the type of the recording medium.

In the above-described third method or fourth method, the correspondence of the binary data of the sub data to the recording attributes of the recording medium can be defined in a complicated manner. Therefore, the confidentiality of the sub data can be improved without changing the sub data embedding pattern in accordance with the disc type.

In the case where the third method and the fourth method are combined with the specified recording pattern in the second method, the sub data can be reproduced only when both the embedding pattern and the specified recording pattern for specifying the embedding position are known. Therefore, the confidentiality is improved further.

[Disc Identifying Method]

When changing the recording method for the sub data in accordance with the type of the recording medium as a measure for effectively preventing unauthorized copying as described above, it is necessary in the reproducing device to discriminate the type of the recording medium. In the example shown in FIG. 8 or FIG. 9, a RAM-type disc requires disc identification to discriminate a CD-R disc and a CD-RW disc.

In this embodiment, a wobbled pit is formed on a ROM-type disc and such a pit is not formed on a RAM-type disc. Therefore, disc identification to discriminate a ROM-type disc and a RAM-type disc can be carried out on the basis of the presence/absence of information from a wobbled pit, that is, on the basis of the presence/absence of a wobbled pit.

As is already known, a CD-R disc and a CD-RW disc, both of which are RAM-type discs, can be discriminated from each other on the basis of the difference in reflectance from the disc.

[Second Example of Data Recording Device]

When a RAM-type disc is classified as a CD-R disc or as a CD-RW disc as shown in FIGS. 8 and 9 and the data recording device shown in FIG. 1 is used, the user must notify the recording device of information about which of a CD-R disc and a CD-RW disc is loaded as a recording medium, for example, by inputting the information from the key input unit 21. However, it is inconvenient. Therefore, in a second example of the data recording device, whether a loaded disc is a CD-R disc or a CD-RW disc is automatically discriminated by using the above-described disc identification method.

Figure 10:
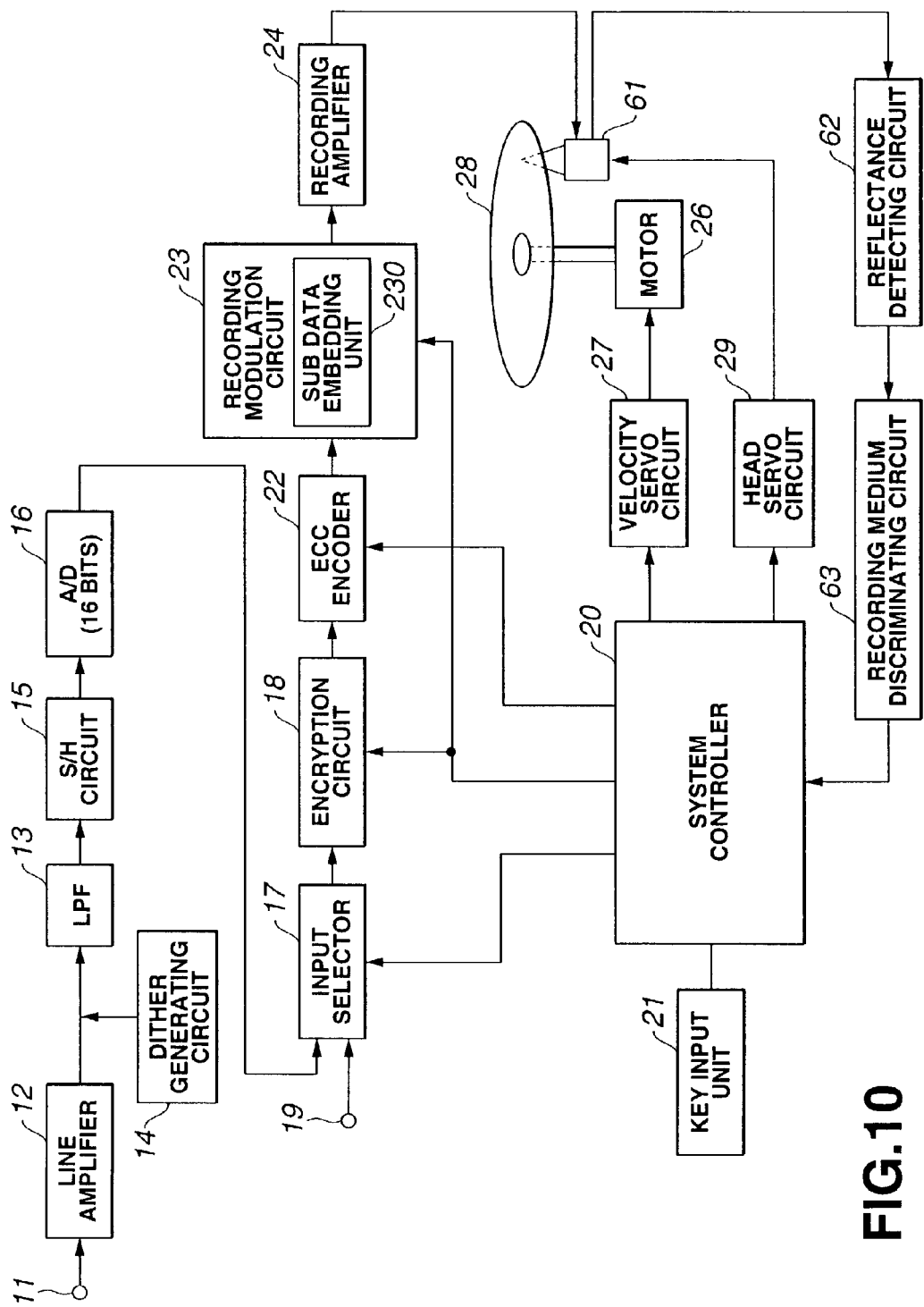
FIG. 10 is a block diagram showing a data recording device according to the present invention.

FIG. 10 shows the structure of a data recording device according to the second embodiment which has a function to automatically discriminate whether a loaded disc is a CD-R disc or a CD-RW disc. In FIG. 10, common parts to those in FIG. 1 are denoted by the same numerals and will not be described further in detail.

In the example of FIG. 10, an optical head 61 is provided in place of the recording head 25 of the example of FIG. 1. The optical head 61 can perform not only reading from a recording medium but also writing to the recording medium. If a magneto-optical recording system is used as a writing system, a magnetic head, though not shown, is provided to face the optical head 61 from the other side of the disc. Similar to the example of FIG. 1, recorded data from a recording amplifier 24 is supplied to the optical head 61 (or the magnetic head).

In this embodiment, information read out from a recording medium 28 by the optical head 61 is supplied to a reflectance detecting circuit 62. The reflectance detected by the reflectance detecting circuit 62 is supplied to a recording medium discriminating circuit 63. On the basis of the output of the detected reflectance from the reflectance detecting circuit 62, the recording medium discriminating circuit 63 discriminates whether the loaded disc 28 is a CD-R disc or a CD-RW disc, and supplies the discrimination output to a system controller 20.

The system controller 20 supplies to a recording modulation circuit 23 a control signal corresponding to the discrimination output from the recording medium discriminating circuit 63. On the basis of the control signal, a sub data embedding unit 230 of the recording modulation circuit 23 carries out sub data embedding processing in accordance with whether the disc 28 is a CD-R disc or a CD-RW disc.

If the recording device can perform recording to all discs including a ROM-type disc and a RAM-type disc, a detecting circuit for the above-described wobbled pit is further provided and the detection output is supplied to the recording medium discriminating circuit 62.

[Second Example of Sub Data Recording Method]

In the above-described first example of the sub data recording method, main data is recorded onto a disc by using EFM as a recording modulation system. However, no margin bits (connection bits) are used in 8-16 modulation or 8-10 modulation used for DAT (digital audio tape), and instead, a plurality of modulation patterns are prepared so as to satisfy the connection conditions and to enable DSV control.

A plurality of code conversion tables for selecting a modulation pattern, for example, four tables are prepared, and an appropriate table is selected from the four tables so as to satisfy the above-described connection conditions and to enable DSV control. The second example of the sub data recording method is a sub data embedding method in the case of thus recording the main data by using a code conversion table.

Similar to the above-described first example, the main data is recorded by edge recording also in 8-16 modulation or 8-10 modulation. In this second example, the sub data is recorded as a recording attribute, for example, a pit or a land in the case of a ROM-type disc, similarly to the first example. However, the sub data is recorded by controlling whether a pit is to be recorded or a land is to be recorded, using the code conversion table instead of the margin bits of the first example.

For example, if "0" of the sub data is caused to correspond to a pit, when the sub data to be embedded is "0", the main data is recorded by using a code conversion table containing a data symbol such that a predetermined bit position, for example, the leading bit position has a pit, in consideration of the seam with the preceding data symbol. When the sub data to be embedded is "1", the main data is recorded by using a code conversion table containing a data symbol such that, for example, the leading bit position has a land, in consideration of the seam with the preceding data symbol.

The other parts of the second example of the sub data recording method are the same as those described in the first example of the sub data recording method, that is, recording of the sub data into a predetermined area on the disc, recording the sub data into a data portion of a predetermined recording pattern, and changing the recording method for the sub data in accordance with the type of the disc.

[Example of Sub Data Recording Method]

An example of the sub data recording method will now be described with reference to the flowchart of FIG. 11. This example shown in FIG. 11 applies to the case of the first example of the sub data recording method in which main data is recorded by EFM while sub data is embedded into leading parts of sub codes of a plurality of sectors in a TOC area in a lead-in area. In this case, a fixed pattern which differs in accordance with the type of the disc as shown in FIG. 8 is recorded in the sub code area. Moreover, the correspondence of bit values "0", "1" of the sub data to the recording attributes is reversed between a ROM-type disc and a RAM-type disc, as shown in FIG. 6.

Figure 11:
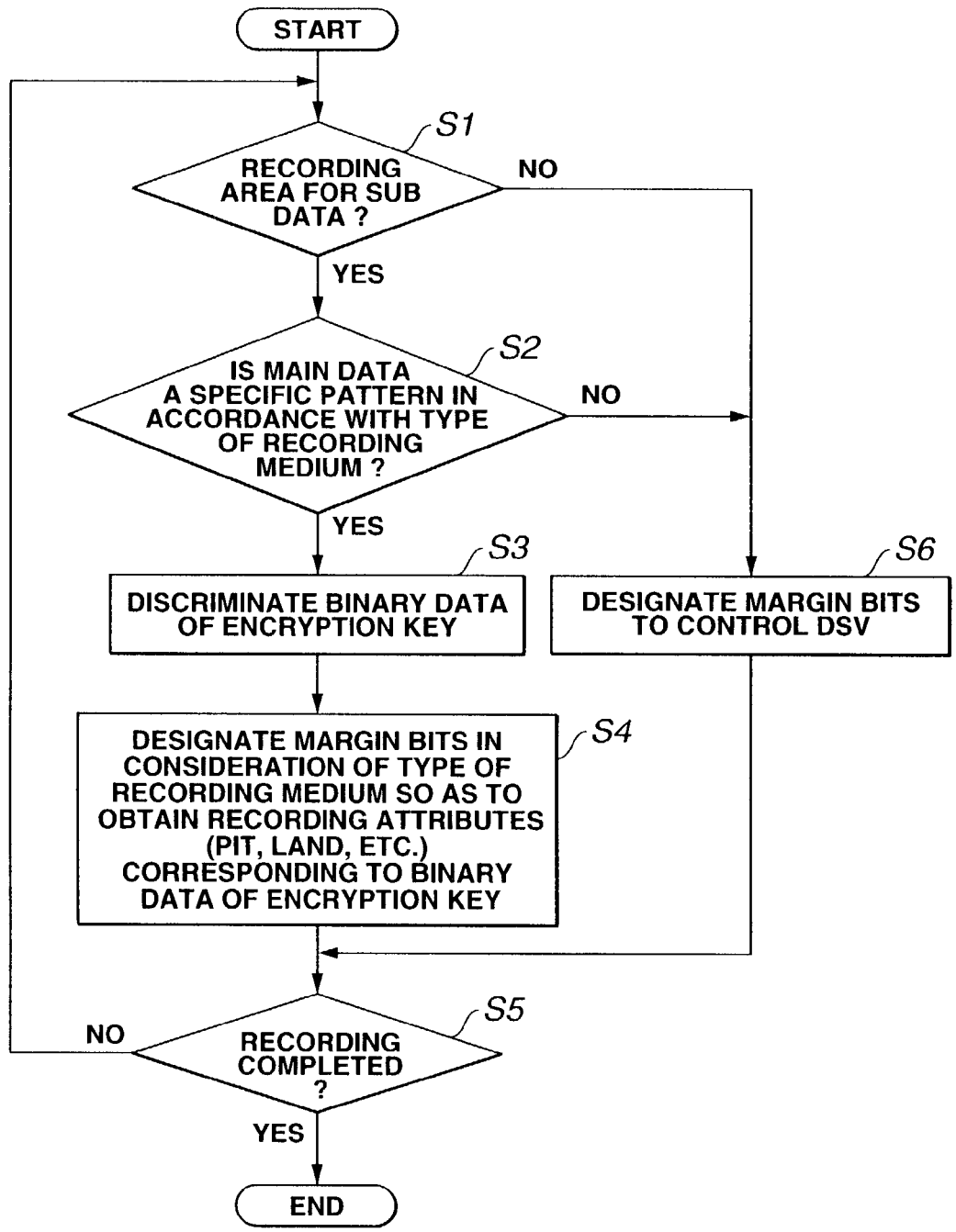
FIG. 11 is a flowchart for explaining a data recording method according to a first embodiment of the present invention.

In this example, as shown in FIG. 11, first, it is discriminated whether or not the recording area where recording is to be carried out is an area where the sub data should be embedded, that is, a TOC area in this example (step S1). Whether the recording area is a TOC area or not is discriminated, for example, on the basis of address data recorded on the disc. If the recording area is not a TOC area, the sub data will not be embedded. Therefore, margin bits of not less than 3T and not more than 11T as described above are secured and a pattern which causes DSV to be zero as much as possible is selected, thus carrying out recording of the main data (step S6). Then, the processing goes to step S5 and it is discriminated whether all the recording of data is completed or not. If it is determined that the recording is completed, the recording processing ends. If it is determined that the recording of data is not completed, the processing returns to step S1.

If it is determined at step S1 that the recording area where recording is to be carried out is an area where the sub data should be embedded, it is discriminated whether or not the main data to be recorded is a predetermined pattern portion in which the sub data should be embedded in accordance with the type of the recording medium, that is, a pattern portion of a synchronizing signal and a sub code in this example (step S2). If the main data is not a pattern portion of a synchronizing signal and a sub code, the processing goes to step S6 and processing similar to the above-described case of recording only the main data is carried out.

If it is determined at step S2 that the main data to be recorded is a predetermined pattern portion in which the sub data should be embedded, that is, a pattern portion of a synchronizing signal and a sub code, it is discriminated whether binary data of an encryption key to be embedded as the sub data in this example is "0" or "1" (step S3). Then, margin bits are selected in consideration of the type of the disc on which recording is to be carried out, so as to achieve a recording attribute corresponding to the discriminated binary data of the sub data (step S4).

Specifically, at step S4, if the type of the disc on which recording is to be carried out is the ROM-type, the corresponding relation between the sub data and the recording attribute of pit/land is as shown in FIG. 6, and therefore margin bits are selected so that the recording attribute of the leading bit position in the sub code area satisfies the relation shown in FIG. 6, in accordance with the data of the encryption key as the sub data.

If the type of the disc on which recording is to be carried out is the RAM-type, for example, in the case of a CD-R disc, the correspondence of the sub data to the recording attribute of the difference in the reflectance is as shown in FIG. 6, and therefore margin bits are similarly selected so that the recording attribute of the leading bit position in the sub code area satisfies the relation shown in FIG. 6, in accordance with the data of the encryption key as the sub data.

If the type of the disc on which recording is to be carried out is the RAM-type, for example, in the case of a CD-RW disc, the recording attribute is crystallinity/amorphousness and is expressed as the difference in the reflectance, similarly to the case of a CD-R disc. Margin bits are similarly selected so that the recording attribute of the leading bit position in the sub code area satisfies the relation shown in FIG. 6, in accordance with the data of the encryption key as the sub data.

After step S4, the processing goes to step S5 and it is discriminated whether all the recording of data is completed or not. If it is determined that the recording is completed, the recording processing ends. If it is determined that the recording is not completed, the processing returns to step S1 and the above-described processing is repeated.

Figure 12:
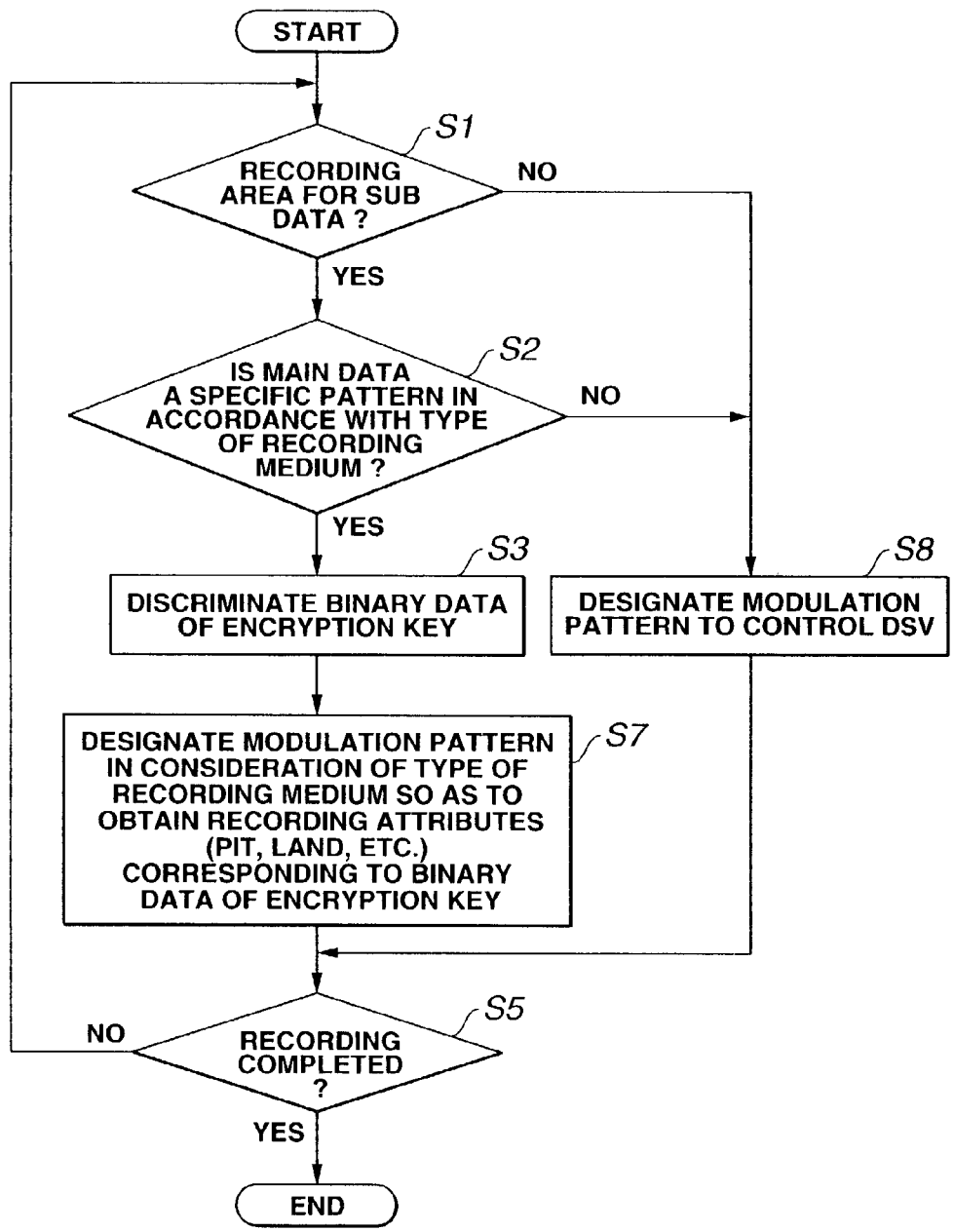
FIGS. 12 and 13 are flowcharts for explaining the data recording method according to the first embodiment of the present invention.

An example shown in FIG. 12 applies to the case of the second example of the sub data recording method in which main data is recorded by 8-16 modulation or 8-10 modulation while sub data is embedded into leading parts of sub codes of a plurality of sectors in a TOC area in a lead-in area. The example of FIG. 12 differs from the example of FIG. 11 in that steps S7 and S8 are provided instead of steps S4 and S6 of FIG. 11, thus selecting a modulation pattern in accordance with the type of the recording medium so as to control the DSV, instead of selecting margin bits.

The flowcharts of FIGS. 11 and 12 illustrate examples of the data recording method, in which the data recording device having the structure shown in FIG. 1 is used as a data recording device if the recording medium is a ROM-type disc whereas the data recording device having the structure shown in FIG. 10 is used if the recording medium is a RAM-type CD-R disc or CD-RW disc. In the case of the data recording device having the structure shown in FIG. 10, a recording medium discrimination step is added in the flowcharts of FIGS. 11 and 12.

Figure 13:
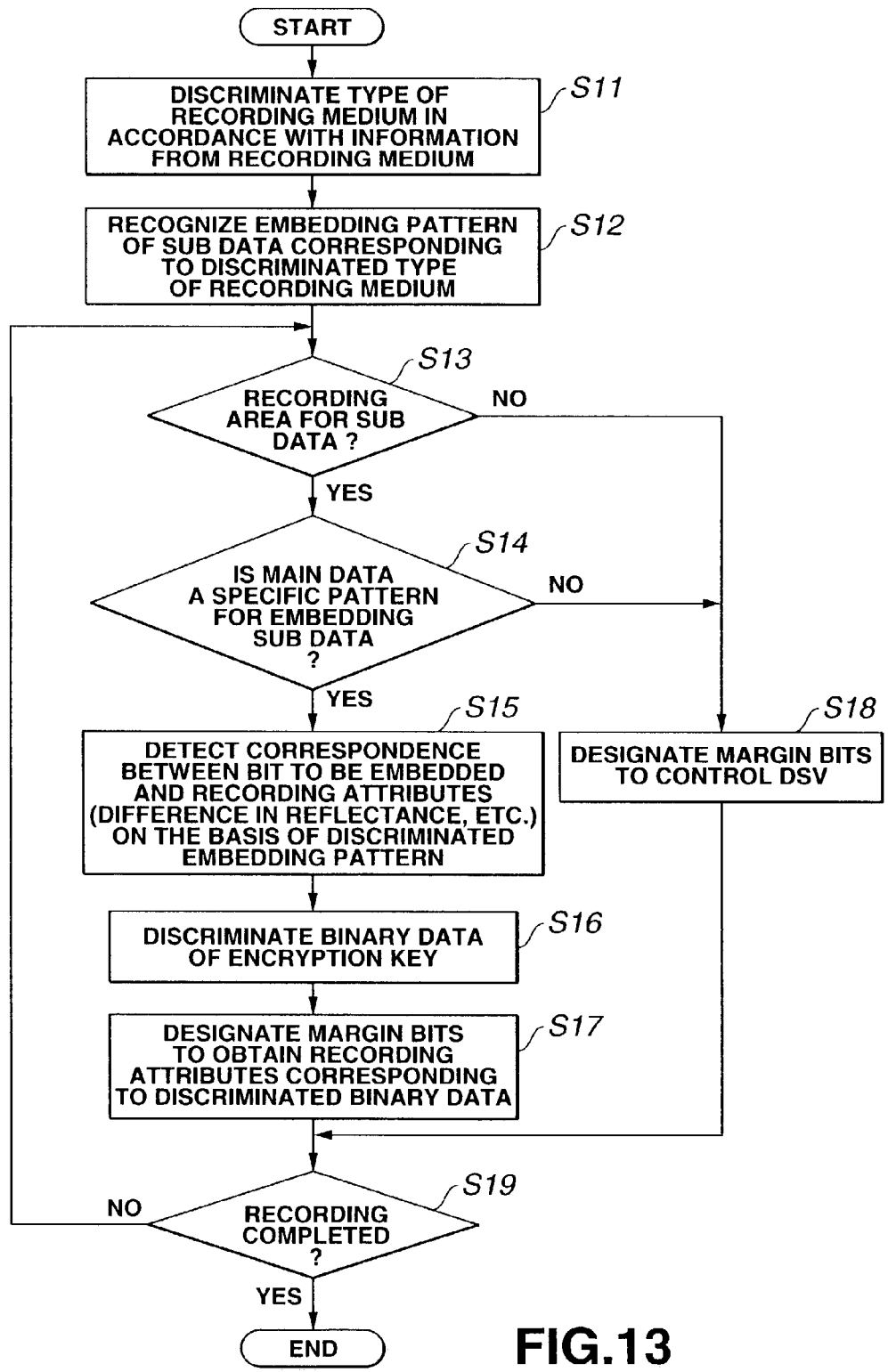

An exemplary recording method will now be described with reference to the flowchart of FIG. 13, in which an embedding pattern is changed in accordance with the type of the recording medium as shown in FIG. 9 by using the data recording device of the structure shown in FIG. 10 and the third method for changing the recording method for the sub data. In this example, the correspondence of the bit value of the sub data to the recording attribute is changeable per bit of the sub data, and an embedding pattern of a four-bit repetition pattern is changed in accordance with the disc type, as shown in FIG. 9.

First, the type of the recording medium is discriminated on the basis of information from the loaded recording medium (step S11). Then, an embedding pattern of the sub data corresponding to the discriminated type of the recording medium is recognized (step S12).

Next, it is discriminated whether or not the recording area where recording is to be carried out is an area where the sub data should be embedded, that is, a TOC area in this example (step S13). For example, whether the recording area is a TOC area or not is discriminated on the basis of address data read out from the disc as the recording medium. If it is determined that the recording area is not a TOC area, the sub data will not be embedded. Therefore, margin bits of not less than 3T and not more than 11T as described above are secured and a pattern which causes DSV to be zero as much as possible is selected, thus carrying out recording of the main data (step S18). Then, the processing goes to step S19 and it is discriminated whether all the recording of data is completed or not. If it is determined that the recording is completed, the recording processing ends. If it is determined at step S19 that the recording of data is not completed, the processing returns to step S13.

If it is determined at step S13 that the recording area is an area where the sub data should be embedded, it is discriminated whether or not the main data to be recorded is a predetermined pattern portion in which the sub data should be embedded, that is, a pattern portion of a synchronizing signal and a sub code in this example (step S14). If not, the processing goes to step S18 and processing similar to the above-described case of recording only the main data is carried out.

If it is determined at step S14 that the main data to be recorded is a predetermined pattern portion in which the sub data should be embedded, that is, a pattern portion of a synchronizing signal and a sub code, the corresponding relation between the bit of the sub data to be embedded in that portion and the recording attribute is detected (at step S15) from the embedding pattern corresponding to the type of the loaded disc (CD-R disc or CD-RW disc) discriminated at step S12.

Then, it is discriminated whether binary data of an encryption key to be embedded as the sub data in this example is "0" or "1" (step S16). Then, margin bits are selected in consideration of the type of the disc on which recording is to be carried out, so that the discriminated binary data of the sub data has a recording attribute defined by the corresponding relation between the bit of the sub data detected at step S15 and the recording attribute (step S17).

Specifically, at step S17, if the type of the disc on which recording is to be carried out is the CD-R type, the corresponding relation between the sub data and the recording attribute of the difference in reflectance is changed every two bits of the sub data in the embedding pattern of four-bit repetition, as shown in FIG. 9. On the other hand, if the type of the disc is the CD-RW type, the corresponding relation between the sub data and the recording attribute of the difference in reflectance is changed every bit of the sub data in the embedding pattern of four-bit repetition. Therefore, margin bits are selected so that the recording attribute of the leading bit position in the sub code area satisfies the relation shown in FIG. 9 corresponding to the type of the disc, in accordance with the data of the encryption key as the sub data.

After step S17, the processing goes to step S19 and it is discriminated whether all the recording of data is completed or not. If it is determined that the recording is completed, the recording processing ends. If it is determined that the recording is not completed, the processing returns to step S13 and the above-described processing is repeated.

[Example of Data Reproducing Device]

Figure 14:
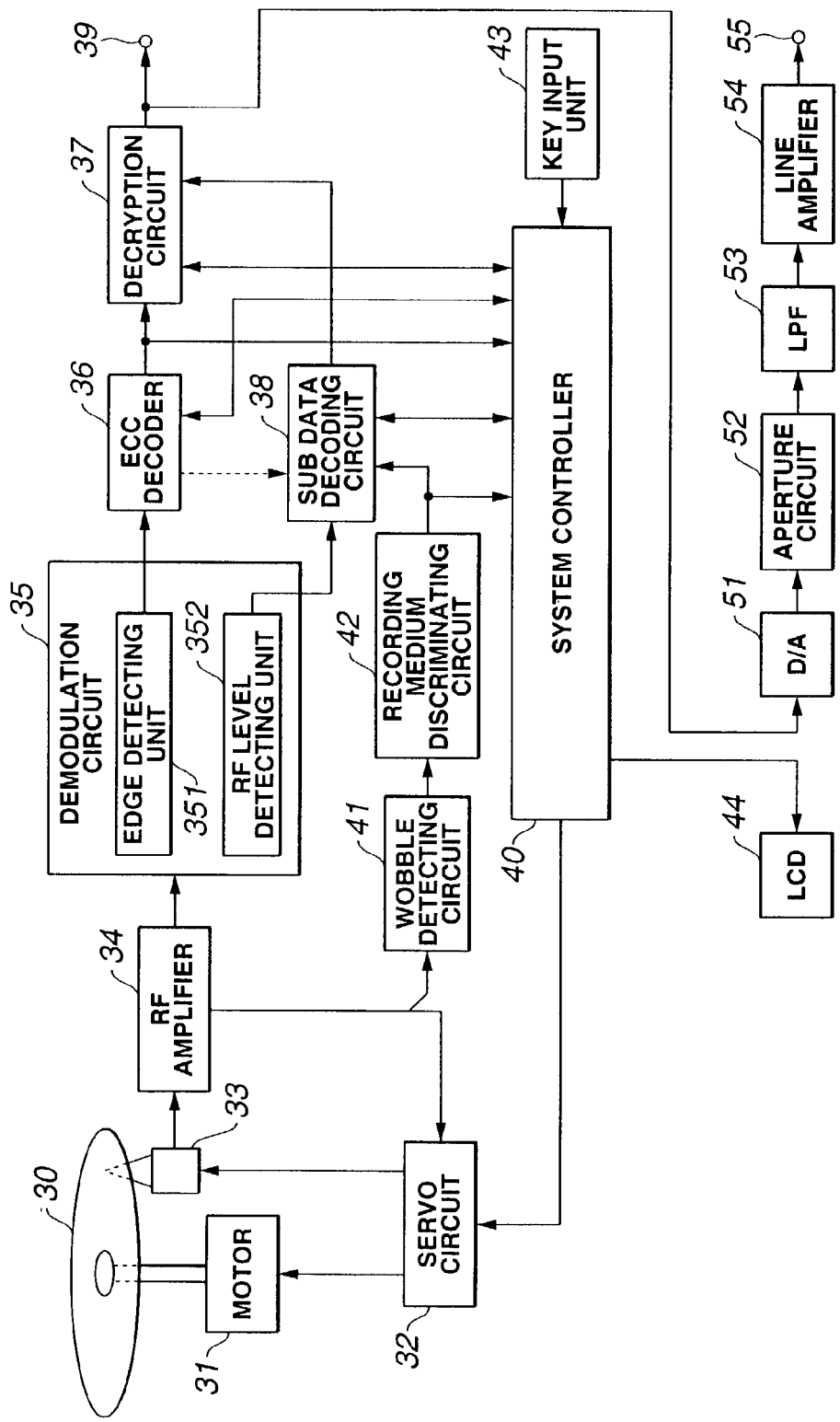
FIG. 14 is a block diagram showing a data reproducing device according to the present invention.

FIG. 14 is a block diagram showing an example of the data reproducing device according to the first embodiment of the present invention. The data reproducing device of this example is a reproducing device for a recording medium on which recording is carried out by the data recording device of FIG. 1 or FIG. 10.

As an optical disc 30, a ROM-type disc or a RAM-type disc as described above can be loaded and data can be reproduced from any of these discs. As a spindle motor 31 has its rotation speed controlled by a servo circuit 32, the optical disc is rotationally driven, for example, at a constant linear velocity as in the conventional CD player. An optical head 33 is servo-controlled by a tracking servo signal, a focusing servo signal and a thread servo signal from the servo circuit 32.

Data read out from the optical disc 30 is supplied to a demodulation circuit 35 via an RF circuit 34. A tracking servo output, a focusing servo output and the like are supplied from the RF circuit 34 to the servo circuit 32.

In the demodulation circuit 35, main data, which is EFM-modulated and recorded, has its edge detected by an edge detecting circuit 351 and the data modulated for recording is demodulated. In this embodiment, the RF level of the data taken out from the disc 30 is detected by an RF level detecting unit 352 and is supplied to a sub data decoding circuit 38.

The main data demodulated by the demodulation circuit 35 is supplied to an ECC decoder 36. The ECC decoder 36 carries out error correction processing using CIRC and supplies the error-corrected audio PCM data to a decryption circuit 37.

Of the main data, demodulated by the demodulation circuit 35 and error corrected by the ECC decoder 36, information about TOC is supplied to a system controller 40 and used there for various types of control.

In this embodiment, the data of a sub code in the main data from the ECC decoder 36, too, is supplied to the system controller 40 and used there for discriminating the type of the loaded disc. However, the disc type detected from the sub code in the main data does not necessarily indicate the correct disc type if transmission of bits at the modulation data level has been carried out.

In this embodiment, the type of the disc 30 is separately discriminated from information unique to the disc. Specifically, in this embodiment, a wobbled pit exists in the lead-in area of a ROM-type disc, whereas such a wobbled pit does not exist on a RAM-type disc, as described above. Since a push-pull signal corresponding to the wobbling of the pit is acquired from the wobbled pit portion, the push-pull signal acquired when reproducing data from the lead-in area is monitored, and whether a wobbled pit exists or not can be discriminated in accordance with whether predetermined data can be extracted from the push-pull signal.

Therefore, the output of the RF amplifier 34 is supplied to a wobble detecting circuit 41. This wobble detecting circuit 41 monitors the push-pull signal in the output of the RF amplifier 34 from the lead-int area, then detects whether or not a wobbled pit exists in the lead-in area, and supplies the detection output to a recording medium discriminating circuit 42.

In accordance with whether a wobbled pit exists or not, the recording medium discriminating circuit 42 discriminates the medium type of the loaded disc 30, that is, a ROM-type disc or a RAM-type disc. Then, the recording medium discriminating circuit 42 supplies the medium type discrimination output to the system controller 40 and also supplies it to the sub data decoding circuit 38.

The sub data decoding circuit 38 detects and decodes the sub data which is recorded correspondingly to the recording attributes of the disc in a specified recording area and a predetermined data portion of the main data, in accordance with the above-described sub data recording method.

For example, if the sub data is recorded in the leading part of the above-described sub code area, the RF level of the sub code area after the synchronizing signal in each frame is sampled, thus extracting the sub data.

As another example of the predetermined data portion in which the sub data is embedded, a recording pattern portion in which all-"0" is followed by all "0" in an eight-bit data symbol prior to EFM processing may be used if the recording medium is a ROM-type disc, and a recording pattern portion in which all-"0" is followed by all-"1" in an eight-bit data symbol prior to EFM processing may be used if the recording medium is a RAM-type disc. In this case, the sub data decoding circuit 38 discriminates the type of the disc from the result of the discrimination at the recording medium discriminating circuit 42, then detects a portion such that the reproducing pattern of the main data, which is detected by the edge detecting unit 351 and error-corrected, coincides with the recording pattern corresponding to the type of the disc, and extracts the sub data embedded in that portion. Specifically, the RF level corresponding to the sub data embedding position is sampled, thus extracting the sub data.

In such a case, the decoding output from the ECC decoder 36 is supplied to the sub data decoding circuit 38 as indicated by a dotted line in FIG. 14. In this case, the sub data decoding circuit 38 needs to have a buffer memory.

The sub data decoding circuit 38 discriminates how the recording attributes correspond to "0", "1" of the sub data, from the type of the disc discriminated by the recording medium discriminating circuit 42, and decodes the sub data extracted as described above.

In this embodiment, the resulting sub data is encryption key information, which is supplied to the decryption circuit 37. The decryption circuit 37 performs decryption processing based on the encryption key information from the sub data decoding circuit 38. The decryption circuit 37 supplies the result of the decryption, that is, whether decryption could be carried out or not, to the system controller 40.

If decryption could not be carried out, the system controller 40 displays a message to that effect on a liquid crystal display 44 and carries out control to stop the disc reproducing operation.

If the decryption circuit 37 could carry out decryption of the audio PCM data from the ECC encoder 36, the decryption circuit 37 outputs the audio PCM signal to outside via a digital output terminal 39 and also supplied it to a D/A converter 51. D/A converter 51 converts the audio PCM signal to an analog audio signal. The analog audio signal is outputted to outside through an aperture circuit 52, a low-pass filter 53, a line amplifier 54 and an analog output terminal 55.

The system controller 40 controls the start and end of reproduction on the basis of the TOC information read from the optical disc 30 and an instruction input from a key input unit 43. Moreover, the system controller 40 discriminates whether reproduction of a disc produced by unauthorized copying is being carried out or not, in the above-described maimer, and carries out control to stop the reproduction in the case of a disc produced by unauthorized copying.

[Example of Data Reproducing Method]

Figure 15:
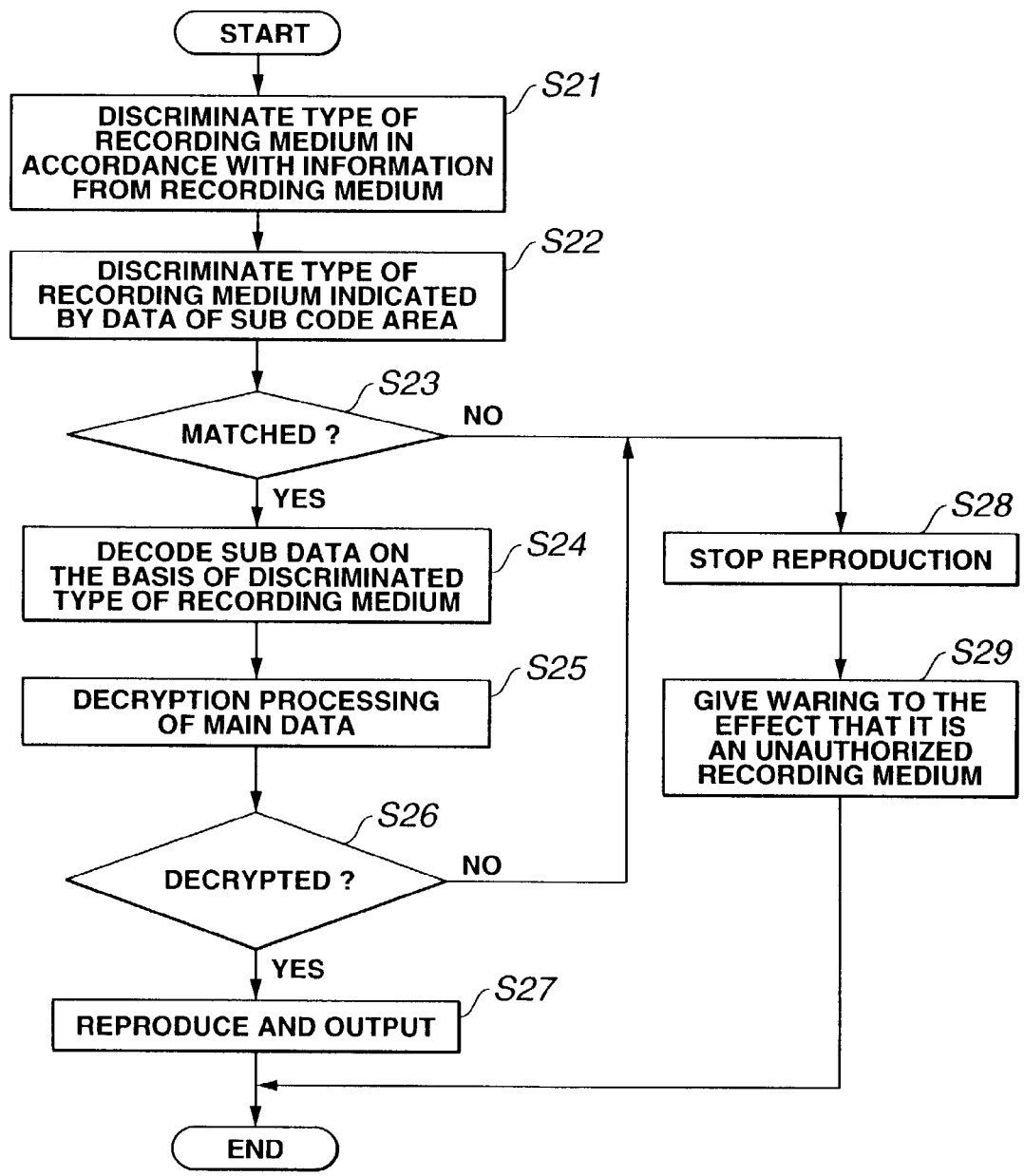
FIG. 15 is a flowchart for explaining a data reproducing method according to the present invention.

FIG. 15 is a flowchart for explaining an embodiment of a data reproducing method using the data reproducing device shown in FIG. 14. In this example, a data reproducing method corresponding to the above-described example of the data recording method is carried out.

Specifically, as shown in FIG. 15, first, the type of the disc is discriminated on the basis of information from the disc as the recording medium, as described above (step S21). In this example, whether the disc is a ROM-type disc or a RAM-type disc is discriminated on the basis of the presence/absence of wobbling information, as described above. If discrimination of a CD-R disc and a CD-RW disc must be made, these discs are discriminated in accordance with the difference in the reflectance from the disc.

Next, in this example, since the data pattern in a sub code area is a fixed pattern corresponding to the type of the disc as described above, the data pattern in the sub code area is detected and the type of the disc indicated by the data pattern is discriminated (step S22).

Then, whether the disc types discriminated at steps S21 and S22 coincide with each other is discriminated (step S23). The discriminations at steps S22 and S23 are carried out by the system controller 40. If the disc types do not coincide with each other, there is a high probability that the recorded data has been copied in an unauthorized manner at the modulation data level.

Therefore, the system controller 40 forces the data reproducing device of FIG. 14 into a reproduction stop state (step S28), and displays a message on the screen of the liquid crystal display 44 as a display unit to the effect that the current disc is a disc medium produced by unauthorized copying, thereby warning the user (step S29). Then, the system controller 40 ends the reproduction processing routine.

If it is determined at step S23 that the disc types discriminated at steps S21 and S22 coincide with each other, the sub data is extracted and decoded on the basis of the discriminated disc type (step S24). Specifically, the sub data is extracted as the recording attribute of the data portion of the recording pattern corresponding to the discriminated disc type, and the extracted sub data is decoded on the basis of the corresponding relation between the value of the sub data corresponding to the discriminated disc type and the recording attribute.

Next, decryption processing of the audio PCM signal is carried out by using the decoded sub data, that is, the encryption key (step S25), and whether the decryption could be carried out or not is discriminated (step S26). This discrimination is carried out by the system controller 40. If the decryption could not be carried out, the system controller 40 forces the data reproducing device into a reproduction stop state (step S28) and displays a message on the screen of the liquid crystal display 44 as a display unit to the effect that the current disc is a disc medium produced by unauthorized copying, thereby warning the user (step S29). Then, the system controller 40 ends the reproduction processing routine.

If the decryption could be carried out at step S26, the audio reproduction signal is outputted (step S27) and the reproduction processing routine ends.

In this embodiment, as described above, even if data has been copied in an unauthorized manner at the modulation data level, reproduction of the copy data can be prevented and therefore unauthorized copying can be effectively prevented.

[Second Embodiment]

The above-described first embodiment and the following second embodiment are different in the method for changing the recording method for the sub data in order to effectively prevent unauthorized copying, and the other parts of these embodiments have similar structures.

In the above-described first embodiment, the recording method for the sub data is changed in accordance with the type of the disc, thereby enabling effective prevention of unauthorized copying even if the sub data is transmitted. On the other hand, in this second embodiment, the recording method for the sub data is changed in accordance with the type of the main data to be recorded onto a recording medium, that is, whether the main data is the original data or copy data, thereby enabling effective prevention of unauthorized copying even if the sub data is transmitted.

In a first method for changing the recording method for the sub data in accordance with the type of the main data to be recorded, the correspondence of the binary data "1", "0" of the sub data to the recording attributes of the recording medium is changed between the case where the main data to be recorded is the original data and the case where the main data to be recorded is copy data. FIG. 16 shows an example of the corresponding relation.

Specifically, in the example of FIG. 16, if the main data to be recorded is the original data, a pit which has a low reflectance and a low RF signal level ("L") in reproduction is caused to correspond to "0" of the sub data, and a land which has a high reflectance and a high RF signal level ("H") in reproduction is caused to correspond to "1" of the sub data.

On the other hand, if the main data to be recorded is copy data, a recording attribute having a low reflectance and a low RF signal level ("L") in reproduction is caused to correspond to "1" of the sub data, and a recording attribute having a high reflectance and a high RF signal level ("H") in reproduction is caused to correspond to "0" of the sub data.

Thus, even when duplication of the data at the modulation level is carried out, for example, from a recording medium on which the original data is recorded, the type of the main data after the duplication is the copy and therefore the bits of the sub data are reproduced as being inverted and the sub data cannot be correctly reproduced.

In a second method for changing the recording method for the sub data in accordance with the type of the main data to be recorded, a predetermined data portion for embedding the sub data is changed at least between the original data and copy data.

FIG. 17 shows an example of this second method. In this example, if the main data to be recorded is the original, the margin bits are controlled and the sub data is embedded in a recording pattern portion having all-"0" followed by all-"0" in an eight-bit data symbol prior to EFM processing. On the other hand, if the main data to be recorded is copy data, the margin bits are controlled and the sub data is embedded in a recording pattern portion having all-"0" followed by all-"1" in an eight-bit data symbol prior to EFM processing.

FIG. 18 shows another example of this second method. In this example, a fixed pattern is recorded in a sub code area and the fixed pattern is varied in accordance with the type of the main data. The data preceding the sub code area is a synchronizing signal, which is a fixed pattern. Therefore, by controlling the margin bits between the synchronizing signal and the sub code, the sub data can be embedded in accordance with whether, for example, the leading part of the sub code area is a pit or a land.

A third method for changing the recording method for the sub data in accordance with the type of the main data to be recorded is a modification of the first method in which the correspondence of the binary data "1", "0" of the sub data to the recording attributes of the recording medium is changed between the original data and copy data.

That is, in the above-described first method, the correspondence of the binary data "1", "0" of the sub data to the recording attributes of the recording medium is univocally changed between the original data and copy data as shown in FIG. 16, whereas in this third method, the correspondence of the binary data of the sub data to the recording attributes of the recording medium is changed every predetermined unit of the sub data, and the change pattern is changed at least between the case where the main data to be recorded is the original data and the case where the main data to be recorded is copy data.

FIG. 19 shows an example of this third method. In this example, the correspondence of the binary data of the sub data to the recording attributes of the recording medium is made changeable every bit of the sub data and is repeated as a three-bit pattern of the sub data. That is, in the example of FIG. 19, one set is made of one bit and three sets each are repeated as a pattern. In this example, the three-set repetition pattern is changed between the case where the main data to be recorded is the original data and the case where the main data to be recorded is copy data.

In the sub data embedding patterns of the example shown in FIG. 19, a solid line indicates "1" of the sub data and a broken line indicates "0" of the sub data.

That is, in the case of the original data, for the first bit of the three-bit repetition of the sub data, a land "H" is allocated to "1" and a pit "L" is allocated to "0", and for the second bit, a land "H" is allocated to "0" and a pit "L" is allocated to "1". For the third bit, a land "H" is allocated to "1" and a pit "L" is allocated to "0".

In the case of copy data, in the three-bit repetition of the sub data, all lands "H" are allocated to "0" and all pits "L" are allocated to "1".

According to this third example, even if duplication of data at the modulation level is carried out, for example, from a recording medium on which the original data is recorded, the type of the main data after the duplication is the copy and the sub data embedding pattern is different. Therefore, the sub data cannot be correctly reproduced, enabling effective prevention of unauthorized copying.

In the example of FIG. 19, a set in the embedding pattern, that is, a unit by which the correspondence of the binary data of the sub data to the recording attributes of the recording medium is changed, is arranged every bit of the sub data. However, it may be changeable every plural bits, for example, every byte (eight bits). Alternatively, it may be changeable every sector or every 32 sectors (one packet/one block).

The repetition cycle is not limited to three sets. As long as the original data can be discriminated from copy data, the repetition sets may be two or more sets.

A fourth method is a modification of the above-described third method. In this fourth method, the correspondence of the binary data of the sub data to the recording attributes of the recording medium is not changed every predetermined data unit of the sub data but is changed in accordance with the difference in the recording area on the disc for the sub data, thus changing the sub data embedding pattern between the original data and copy data.

Specifically, the correspondence of the binary data of the sub data to the recording attributes of the recording medium is made changeable every area for recording the sub data such as the lead-in area, the lead-out area and the TOC area. In accordance with the type of the main data, the correspondence of the binary data of the sub data to the recording attributes of the recording medium is changed among the plurality of areas.

The area for recording the sub data may also be changed in accordance with the type of the main data.

Of course, it is possible to combine the first method and the second method for changing the recording method for the sub data in accordance with the type of the main data to be recorded. Specifically, the corresponding relation between "0", "1" of the sub data and the recording attributes such as pit and land is changed in accordance with the type of the main data, and the sub data embedding pattern is changed in accordance with the type of the main data.

It is also possible to optionally combine the first method, the second method, the third method or the fourth method for changing the recording method for the sub data in accordance with the type of the main data. For example, the sub data is recorded in a predetermined data portion including a specified recording pattern which differs in accordance with the type of the main data, and the sub data embedding pattern including a change in the corresponding relation between "0", "1" of the sub data and the recording attributes such as pit and land is varied in accordance with the type of the main data.

In the case where the third method and the fourth method are combined with the specified recording pattern in the second method, the sub data can be reproduced only when both the embedding pattern and the specified recording pattern for specifying the embedding position are known. Therefore, the confidentiality is improved further.

[Identifying Method for Whether Main Data is Original Data or Copy Data]

In recording data, an authoring device is used to input to the recording device an identifier indicating whether the main data to be recorded is the original data or copy data, and the identifier is contained and recorded in, for example, the header information of the main data or the TOC information.

In reproducing this disc, whether the main data is the original or copy data can be identified by reading out the TOC information or reproducing the header information from the disc.

In the case of a data recording device used by a user, data except for the data prepared by the user himself/herself are copy data. Therefore, if the recording device has a microphone terminal, data recorded through the microphone terminal may be considered as the original data and other data may be considered as copy data.

Again, the identifier for the original data or copy data is contained and recorded in the header information of the main data or the TOC information.

In the case of a data recording device for user which is not adapted for recording the original data, all the main data is considered as copy data and the identifier may be recorded in the header or TOC.

The identifier for the original data or copy data may be recorded as watermarking information in the main data.

[Example of Data Recording Device of Second Embodiment]

Figure 20:
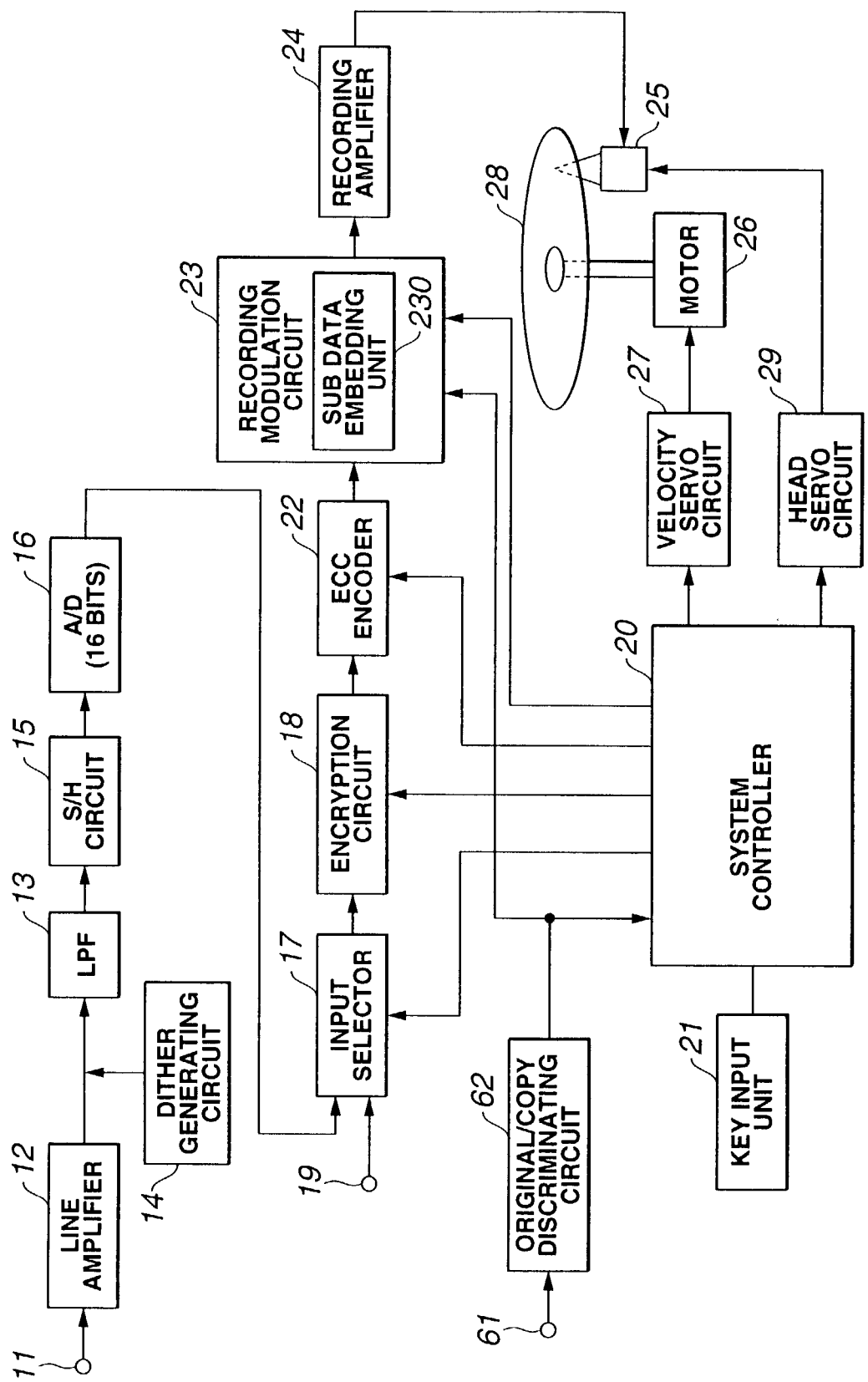
FIG. 20 is a block diagram showing a data recording device to which the data recording method according to the second embodiment of the present invention is applied.

FIG. 20 is a block diagram showing an exemplary structure of a data recording device according to the second embodiment. In FIG. 20, common parts to those in FIG. 1 are denoted by the same numerals and will not be described further in detail.

The example of FIG. 20 represents the authoring device of FIG. 1 according to the first embodiment. The structure of the device of FIG. 20 differs from that of FIG. 1 in that, in the device of FIG. 20, there is provided an input terminal 61 for inputting an identifier indicating whether the main data to be recorded is the original data or copy data, and an original/copy discriminating circuit 62 for discriminating the identifier inputted from the input terminal 61 so that the discrimination output is supplied to a system controller 20 and is also supplied to a recording modulation circuit 23. The device of FIG. 20 also differs from the device of FIG. 1 in that the system controller 20 performs control so that the sub data embedding method is changed in accordance with whether the main data to be recorded is the original data or copy data, as described above.

Figure 21:
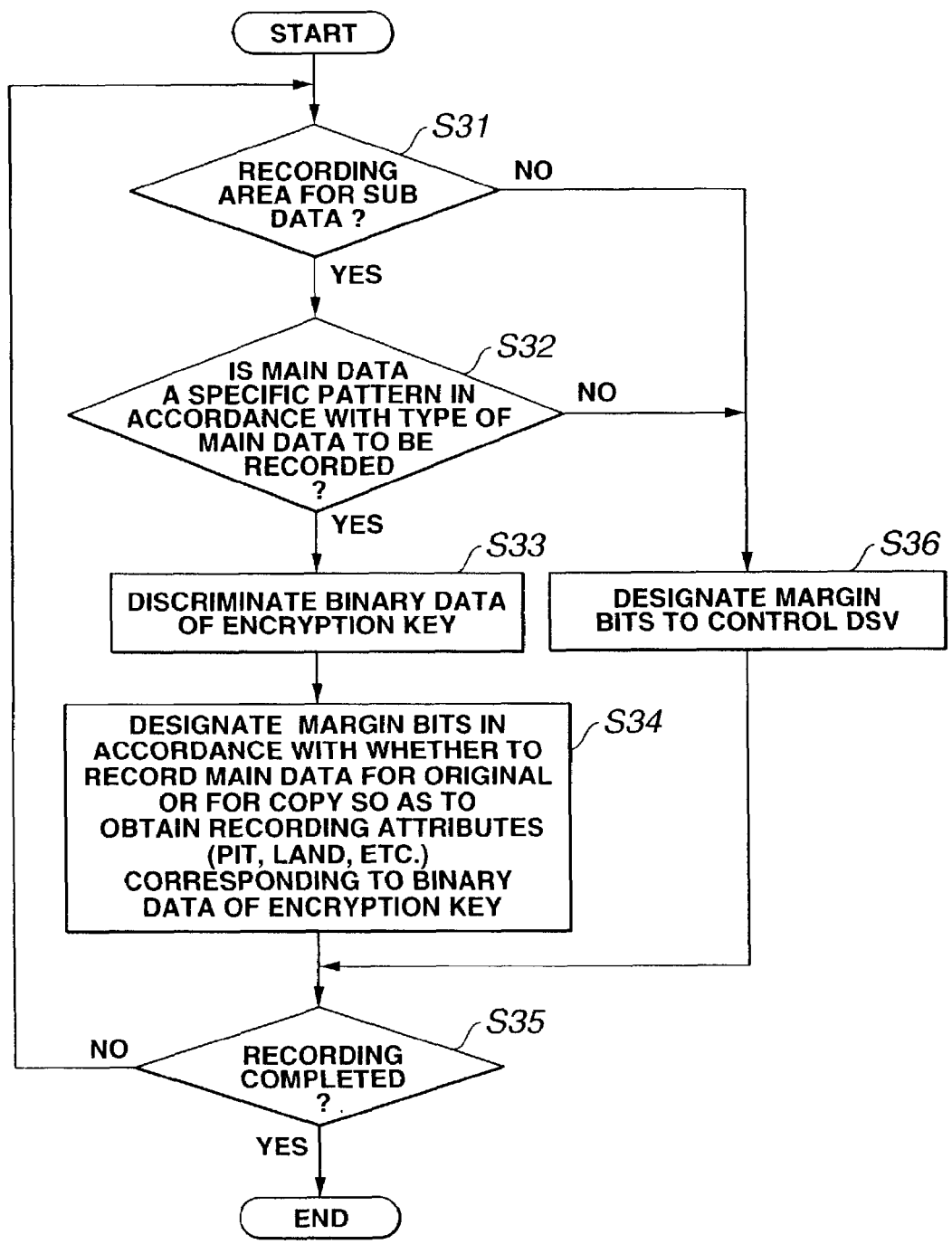
FIG. 21 is a flowchart for explaining the data recording method according to the second embodiment of the present invention.

An example of the sub data recording method in this case is shown in the flowchart of FIG. 21. This flowchart of FIG. 21 corresponds to the flowchart for explaining the example of the sub data recording method in the first embodiment shown in FIG. 11.

Specifically, the example shown in FIG. 21 applies to the case of the first example of the sub data recording method in which main data is recorded by EFM while sub data is embedded into leading parts of sub codes of a plurality of sectors in a TOC area in a lead-in area. In this case, a fixed pattern which differs in accordance with the type of the main data to be recorded as shown in FIG. 18 is recorded in the sub code area. Moreover, the correspondence of bit values "0", "1" of the sub data to the recording attributes is reversed between the case where the main data to be recorded is the original data and the case where the main data to be recorded is copy data, as shown in FIG. 16.

In this example, as shown in FIG. 21, first, it is discriminated whether or not the recording area is an area where the sub data should be embedded, that is, a TOC area in this example (step S31). If the recording area is not a TOC area, the sub data will not be embedded. Therefore, margin bits of not less than 3T and not more than 11T as described above are secured and a pattern which causes DSV to be zero as much as possible is selected, thus carrying out recording of the main data (step S36). Then, the processing goes to step S35 and it is discriminated whether all the recording of data is completed or not. If it is determined that the recording is completed, the recording processing ends. If it is determined at step S35 that the recording of data is not completed, the processing returns to step S31.

If it is determined at step S31 that the recording area is an area where the sub data should be embedded, it is discriminated whether or not the main data to be recorded is a predetermined pattern portion in which the sub data should be embedded in accordance with the type of the main data, that is, a pattern portion of a synchronizing signal and a sub code in this example (step S32). If not, the processing goes to step S36 and processing similar to the above-described case of recording only the main data is carried out.

If it is determined at step S32 that the main data to be recorded is a predetermined pattern portion in which the sub data should be embedded, that is, a pattern portion of a synchronizing signal and a sub code, it is discriminated whether binary data of an encryption key to be embedded as the sub data in this example is "0" or "1" (step S33). Then, margin bits are selected in accordance with whether the main data to be recorded is the original data or copy data, so as to achieve a recording attribute corresponding to the discriminated binary data of the sub data (step S34).

For example, at step S34, if the main data to be recorded is the original data, the corresponding relation between the sub data and the recording attribute of pit/land is as shown in the top of the table of FIG. 16, and therefore margin bits are selected so that the recording attribute of the leading bit position in the sub code area satisfies the relation shown in FIG. 16, in accordance with the data of the encryption key as the sub data.

If the main data to be recorded is copy data, the correspondence of the sub data to the recording attribute of the difference in the reflectance is as shown in the bottom of the table of FIG. 16, and therefore margin bits are similarly selected so that the recording attribute of the leading bit position in the sub code area satisfies the relation shown in FIG. 16, in accordance with the data of the encryption key as the sub data.

After step S34, the processing goes to step S35 and it is discriminated whether all the recording of data is completed or not. If it is determined that the recording is completed, the recording processing ends. If it is determined at step S35 that the recording is not completed, the processing returns to step S31 and the above-described processing is repeated.

The above-described example applies to the first example of the sub data recording method in which the main data is modulated by the EFM system and then recorded. Again, the second example of the sub data recording method, in which main data is recorded by 8-16 modulation or 8-10 modulation, is applicable to this second embodiment.

That is, in the second example of the sub data recording method, for example, at steps S34 and S36 in the flowchart of FIG. 21, a modulation pattern is selected so as to control the DSV, instead of selecting margin bits.

[Example of Data Reproducing Method of Second Embodiment]

Figure 22:
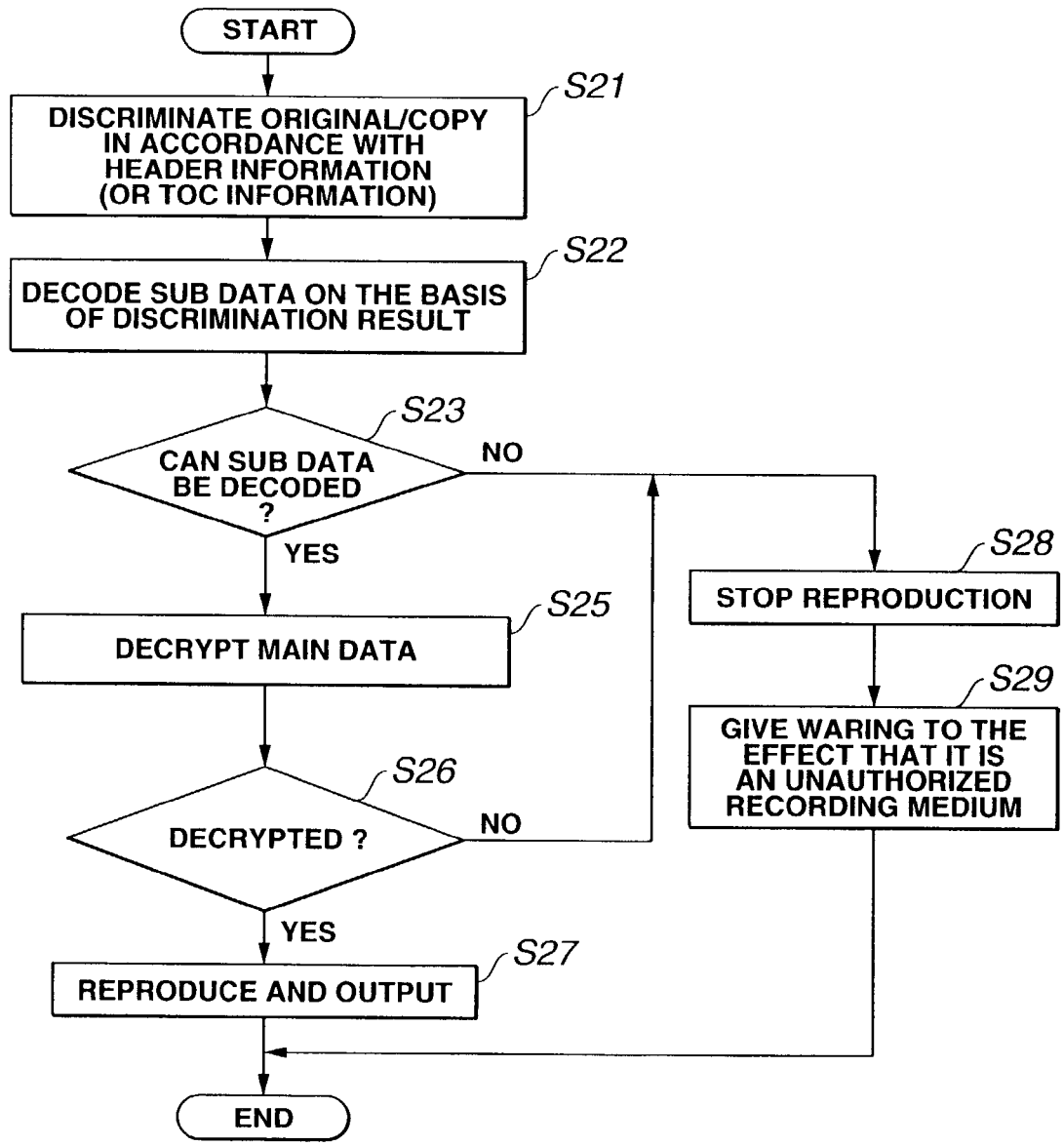
FIG. 22 is a flowchart for explaining a data reproducing method according to the present invention.

FIG. 22 is a flowchart for explaining an example of a data reproducing method of the second embodiment. This example applies to a data reproducing method corresponding to the above-described example of the data recording method of FIG. 21.

Specifically, as shown in FIG. 22, first, whether the type of the main data recorded on the disc is the original data or copy data is discriminated on the basis of the header information of the data read out from the disc as the recording medium (step S41).

Next, the sub code is decoded on the basis of the result of the discrimination (step S42). Then, whether the sub data can be decoded or not is discriminated. This discrimination at step S43 is called out by the system controller. If the sub data cannot be decoded, there is a high probability that the main data has been copied in an unauthorized manner at the modulation data level.

Therefore, the system controller 40 forces the data reproducing device into a reproduction stop state (step S47), and displays a message on the screen of a liquid crystal display or the like to the effect that the current disc is a disc medium produced by unauthorized copying, thereby warning the user (step S48). Then, the system controller ends the reproduction processing routine.

If it is determined at step S43 that the sub data can be decoded, decryption processing of the audio PCM signal of the main data is carried out by using the sub data, that is, the encryption key (step S44), and whether the decryption could be carried out or not is discriminated (step S45). This discrimination is carried out by the system controller. If the decryption could not be carried out, the system controller forces the data reproducing device into a reproduction stop state (step S47) and displays a message on the screen of the liquid crystal display to the effect that the current disc is a disc medium produced by unauthorized copying, thereby warning the user (step S48). Then, the system controller ends the reproduction processing routine.

If the decryption could be carried out at step S45, the audio reproduction signal is outputted (step S46) and the reproduction processing routine ends.

In this second embodiment, as described above, even if data has been copied in an unauthorized manner at the modulation data level, reproduction of the copy data can be prevented and therefore unauthorized copying can be effectively prevented.

[Other Embodiments]

In the above-described first embodiment, the recording method for the sub data is changed in accordance with the type of the disc, while in the second embodiment, the recording method for the sub data is changed in accordance with the type of the main data to be recorded. These two embodiments can be combined.

Specifically, at present, the commercially available CDs are ROM-type discs, which only contain original data. On the other hand, CD-R discs and CD-RW discs are RAM-type discs and a small number such discs having original data recorded thereon are commercially available.

So-called backup CDs (CD-ROM discs) and special CDs for promotion are ROM-type discs, but the main data recorded thereon are copy data. If the main data is copy data, the user duplicates and records the data to a CD-R disc or a CD-RW disc as usual.

In this manner, the main data recorded on a ROM-type disc is not necessarily the original data, and the main data recorded on a RAM-type disc is not necessarily copy data.

Thus, it is effective to change the recording method for the sub data in accordance with both the type of the disc and the type of the main data.

FIG. 23 shows an example of such a case. Specifically, the sub data recording pattern is changed in accordance with four types, that is, a ROM-type disc on which the original data is recorded, a RAM-type disc on which the original data is recorded, a ROM-type disc on which copy data is recorded, and a RAM-type disc on which copy data is recorded.

In the example of FIG. 23, the sub data is recorded so that a predetermined recording pattern of the sub data consists of four sets, with each set being made of one bit, a plurality of bits, one sector, or a plurality of sectors. The recording pattern is changed in accordance with the above-described four types of discs, as shown in FIG. 23.

In the above-described embodiments, the recording attributes of pit/land, change in the refractive index of the recording layer, and crystallinity/amorphousness are used. However, this invention is also applicable to the case where the sub data is recorded by causing "0", "1" of data to the north and south poles in the case of magnetic recording or changes in magnetization in a vertical magnetization film in the case of magneto-optical recording, as the recording attributes.

The sub data embedding position is not limited to the leading bit position in the latter of two data symbols. The sub data can be embedded at any position as long as the bit position can be specified, for example, the second or third from the leading part.

In the above-described embodiments, the recording pattern for recording the sub data is changed between a ROM-type disc and a RAM-type disc. However, the recording pattern may also be changed, for example, between a CD-R disc and a CD-RW disc, both of which are RAM-type discs.

By recording predetermined pattern data as the sub data and then examining the corresponding relation between "0", "1" of the sub data and the recording attributes in accordance with the reproducing pattern data, it is possible to identify whether the recording medium is a ROM-type medium or a RAM-type medium.

In the above-described examples, one of TOC areas is selected as an area for recording the sub data. However, a plurality of recording areas may be used. Moreover, while one recording pattern portion is used as a predetermined data portion for embedding the sub data in the above-described examples, a plurality of types of recording pattern portions may be used. The use of a plurality of types of recording pattern portions can further improve the confidentiality of the sub data.

In the above-described embodiments, encryption key information is embedded as the sub data. However, the sub data is not limited to this and various types of information can be used such as copyright information and duplicate control information.

Furthermore, the recording medium is not limited to a disc medium such as an optical disc and this invention is also applicable to any recording media including a magnetic tape, an optical tape, a magnetic card, an optical card, a semiconductor memory and a card memory.

The recorded data is not limited to audio data and this invention is also applicable to video data, text data and other data.

INDUSTRIAL APPLICABILITY

As described above, according to the present invention, sub data recorded with its confidentiality secured is used, thereby enabling easy detection of unauthorized copying even when bits of recorded data are transmitted (or copied) at the modulation data level.

The invention claimed is:

1. A recording method for a recording medium, comprising the steps of:
    modulation processing main data;
    recording the modulation processed main data onto a recording medium on which an identification part indicating a type of said recording medium is provided, so that said modulation processed main data are readable as optical changes; and
    embedding sub data at least into margin bits of said modulation processed main data based on a format corresponding to said type of said recording medium and recording said sub data along with said modulation processed main data;
    wherein the margin bits are used for adjustment of deviation in a direct current balance of the recorded modulation processed main data;
    wherein said main data has a header portion and data indicating said type of said recording medium is recorded in said header portion.

2. The recording method for a recording medium as claimed in claim 1, wherein encryption processing is performed on text data of said main data that are then recorded and said sub data are data for decoding said encryption processing performed on said text data of said main data.

3. The recording method for a recording medium as claimed in claim 1, wherein said sub data is embedded based on a format corresponding to said type of said recording medium, at least a first format for a reproduction-only-type recording medium and a second format for a recordable-type recording medium.

4. The recording method for a recording medium as claimed in claim 3, wherein said sub data are embedded into margin bits of said modulation processed main data so as to satisfy a connection condition due to said modulation processing performed on said modulation processed main data.

5. The recording method for a recording medium as claimed in claim 1, wherein said sub data are embedded in accordance with said modulation processing performed on said main data.

6. A recording medium on which modulation processed main data are recorded so that said main data are readable as optical changes and on which sub data are recorded along with said modulation processed main data, said sub data being embedded in at least margin bits of said modulation processed main data based on a format corresponding to a type of the recording medium and said recording medium having an identification part indicating said type of said recording medium;
    wherein the margin bits are used for adjustment of deviation in a direct current balance of the recorded modulation processed main data;
    wherein said main data has a header portion and data indicating said type of said recording medium is recorded in said header portion.

7. The recording medium as claimed in claim 6, wherein encryption processing is performed on text data of said main data that are then recorded and said sub data are data for decoding said encryption processing performed on said text data of said main data.

8. The recording medium as claimed in claim 6, wherein said sub data are embedded based on a format corresponding to said type of said recording medium, at least a first format for a reproduction-only type recording medium and a second format for a recordable type recording medium.

9. The recording medium as claimed in claim 8, wherein said sub data are embedded into margin bits of said modulation processed main data so as to satisfy a connection condition due to said modulation processing performed on said main data.

10. The recording medium as claimed in claim 6, wherein said sub data are embedded in accordance with said modulation processing performed on said main data.

11. A recording method for a recording medium, comprising the steps of:
   modulation processing data;
   recording said modulation processed data onto a recording medium so that said modulation processed data are readable as optical changes; and
   embedding and recording sub data into margin bits of said modulation processed data recorded in a predetermined recording area of said recording medium based on a format corresponding to a type of said recording medium;
   wherein the margin bits are used for adjustment of deviation in a direct current balance of the recorded modulation processed data;
   wherein said modulation processed data has a header portion and data indicating said type of said recording medium is recorded in said header portion.

12. The recording method for a recording medium as claimed in claim 11, wherein said recording medium has a first recording area in which said data are to be recorded and a second recording area that is provided at a position to be read prior to said first recording area and in which table-of-contents data are to be recorded; and said method further comprises the step of embedding said sub data into said data recorded in said second recording area.

13. The recording method for a recording medium as claimed in claim 11, wherein said margin bits are selected based on a format corresponding to said type of said recording medium.

14. The recording method for a recording medium as claimed in claim 12, wherein said sub data are embedded into said modulation processed data so as to satisfy a connection condition due to said modulation processing.

15. The recording method for a recording medium as claimed in claim 11, wherein encryption processing is performed on said data to be recorded onto said recording medium that are then recorded; and said sub data are data for decoding encryption processing performed on said data to be recorded onto said recording medium.

16. A recording method for a recording medium, comprising the steps of:
   identifying a type of a loaded recording medium;
   selecting a data format for embedding sub data into modulation processed data recorded on said loaded recording medium based on a result of said identification so that said modulation processed data are readable as optical changes;
   discriminating whether a recording area in which recording is to be performed is a recording area in which said sub data should be embedded; and
   embedding and recording said sub data into margin bits of modulation processed data to be recorded in a predetermined area of said recording medium based on said selected data format when it is determined that said recording is to be performed in said recording area in which recording is to be performed based on a result of said discrimination;
   wherein the margin bits are used for adjustment of deviation in a direct current balance of the recorded modulation processed data;
   wherein said modulation processed data has a header portion and data indicating said type of said recording medium is recorded in said header portion.

17. The recording method for a recording medium as claimed in claim 16, wherein said margin bits are selected based on said result of said identification of said type of said recording medium.

18. The recording method for a recording medium as claimed in claim 17, wherein said sub data are embedded into margin bits of said modulation processed data so as to satisfy a connection condition due to said modulation processing.

19. The recording method for a recording medium as claimed in claim 17, wherein margin bits in accordance with said predetermined modulation system are selected when said result of said discrimination indicates that said area in which said recording is to be performed is not a recording area in which said sub data should be embedded.

20. The recording method for a recording medium as claimed in claim 16, wherein said recording medium has an identification part indicating whether it is a reproduction-only recording medium or a recordable recording medium; and said method further comprises the step of identifying said type of said loaded recording medium based on said identification part of said recording medium.

21. The recording method for a recording medium as claimed in claim 16, wherein said margin bits are selected based on said result of said identification of said type of said recording medium.

22. The recording method for a recording medium as claimed in claim 16, wherein said sub data are embedded into margin bits of said modulation processed data so as to satisfy a connection condition due to said modulation processing.

23. The recording method for a recording medium as claimed in claim 20, wherein whether said recording medium is one of a write-once recording medium and a rewritable recording medium is identified based on a reflectance of said recording medium; and said sub data are embedded by selecting said margin bits based on a result of said identification.

24. A recording device for a recording medium, comprising:
   an encoding processing unit for performing recording modulation processing on inputted data and processing to embed sub data into margin bits of said modulation processed data based on a data format selected based on a type of a recording medium to be recorded; and
   a head unit supplied with output data from said encoding unit and adapted for performing said recording on said recording medium;
   wherein the margin bits are used for adjustment of deviation in a direct current balance of the recorded modulation processed data;
   wherein said inputted data has a header portion and data indicating said type of said recording medium is recorded in said header portion.

25. The recording device for a recording medium as claimed in claim 24, further comprising an encryption processing unit for performing encryption processing on said inputted data and for supplying said data to said encoding unit.

26. The recording device for a recording medium as claimed in claim 25, wherein said encoding processing unit has a modulation processing unit for performing modulation processing on output data from said encryption processing unit and causes said modulation processing unit to embed data for canceling said encryption processing performed on said output data from said encryption processing unit as said sub data.

27. The recording device for a recording medium as claimed in claim 24, further comprising an identifying unit for identifying said type of a recording medium loaded on said device, wherein said encoding processing unit selects said data format and embeds said sub data into the margin bits of said modulation processed data based on a result of identification by said identifying unit.

28. A recording device for a recording medium, comprising:
 a head unit for recording data onto a recording medium so that said data are optically readable, the recording medium having a first recording area in which said data are to be recorded and a second recording area provided at a position to be read prior to said first recording area;
 an encoding processing unit for performing recording modulation processing on inputted data and processing to embed sub data into margin bits of said modulation processed data based on a data format selected based on a type of said recording medium; and
 a control unit for controlling said encoding processing unit and said head unit so as to record said modulation processed data to be recorded in said second recording area;
 wherein the margin bits are used for adjustment of deviation in a direct current balance of the recorded modulation processed data;
 wherein said data has a header portion and data indicating said type of said recording medium is recorded in said header portion.

29. The recording device for a recording medium as claimed in claim 28, wherein said control unit discriminates whether said recording area on said recording medium in which recording is to be performed is said second recording area and when a result of said discrimination indicates said second recording area said control unit controls said head unit to record said modulation processed data into said second recording area.

30. The recording device for a recording medium as claimed in claim 29, wherein said control unit discriminates whether said recording area on said recording medium in which recording is to be performed is said second recording area and when said result of said discrimination indicates said second recording area said control unit controls said head unit to record onto said recording medium said modulation processed data.

31. The recording device for a recording medium as claimed in claim 28, further comprising an identifying unit for identifying said type of said recording medium loaded on said device, wherein said encoding processing unit selects said data format and embeds said sub data into margin bits of said modulation processed data based on a result of said identification by said identifying unit.

* * * * *

UNITED STATES PATENT AND TRADEMARK OFFICE
CERTIFICATE OF CORRECTION

PATENT NO. : 7,302,588 B2 Page 1 of 1
APPLICATION NO. : 10/069538
DATED : November 27, 2007
INVENTOR(S) : Yoichiro Sako, Shunsuke Furukawa and Tatsuya Inokuchi It is certified that error appears in the above-identified patent and that said Letters Patent is hereby corrected as shown below:

In Column 8, Line 43, "attribute is not inverted." should read as follows, as well as beginning a new paragraph --In this case, for example, [000] is selected as the margin bits and the recording attribute is not inverted.--

Signed and Sealed this

Twenty-fifth Day of November, 2008

JON W. DUDAS
*Director of the United States Patent and Trademark Office*